(12) United States Patent
Kitchens, II et al.

(10) Patent No.: US 9,465,429 B2
(45) Date of Patent: Oct. 11, 2016

(54) IN-CELL MULTIFUNCTIONAL PIXEL AND DISPLAY

(71) Applicant: Qualcomm Incorporated, San Diego, CA (US)

(72) Inventors: Jack Conway Kitchens, II, Buffalo, NY (US); John Keith Schneider, Snyder, NY (US); David William Burns, San Jose, CA (US); Suryaprakash Ganti, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/137,423

(22) Filed: Dec. 20, 2013

(65) Prior Publication Data

US 2014/0354597 A1 Dec. 4, 2014

Related U.S. Application Data

(60) Provisional application No. 61/830,548, filed on Jun. 3, 2013, provisional application No. 61/830,601, filed on Jun. 3, 2013, provisional application No. 61/830,606, filed on Jun. 3, 2013.

(51) Int. Cl.
*G06F 1/32* (2006.01)
*G06F 3/042* (2006.01)
(Continued)

(52) U.S. Cl.
CPC ......... *G06F 1/3215* (2013.01); *G01S 7/52085* (2013.01); *G02F 1/13338* (2013.01); *G06F 3/02* (2013.01); *G06F 3/042* (2013.01);
(Continued)

(58) Field of Classification Search
CPC .......... G01S 7/52085; G02F 1/13338; G06F 1/3215; G06F 2203/04106; G06F 3/0412; G06F 3/042; G06F 3/0421; G06F 3/043; G06F 3/044; G06K 9/0002; G06K 9/0004; G06K 9/6293
USPC ....................................................... 345/173
See application file for complete search history.

(56) References Cited

U.S. PATENT DOCUMENTS 5,495,137 A 2/1996 Park et al.
5,610,629 A 3/1997 Baur
(Continued)

FOREIGN PATENT DOCUMENTS

EP 2390764 A1 11/2011
GB 2196164 A 4/1988
(Continued)

OTHER PUBLICATIONS

Abileah A., et al., "59.3: Integrated Optical Touch Panel in A 14.1 AMLCD," SID Symposium Digest of Technical Papers, vol. 35 (1), May 25-27, 2004, pp. 1544-1547, XP007012013, Chapter 3, Optical Performance.

(Continued)

*Primary Examiner* — Viet Pham
(74) *Attorney, Agent, or Firm* — Weaver Austin Villeneuve & Sampson LLP

(57) ABSTRACT

A multifunctional pixel is disclosed. The multifunctional pixel may include a display pixel, a photoelectric sensor, and a second sensor. The second sensor may include one of the following: an ultrasonic sensor and an infrared sensor. The display pixel, the photoelectric sensor, and the second sensor may be located in the multifunctional pixel.

29 Claims, 48 Drawing Sheets

(51) Int. Cl.

| | | |
|---|---|---|
| *G01S 7/52* | (2006.01) | |
| *H04N 5/33* | (2006.01) | |
| *G02F 1/1333* | (2006.01) | |
| *G06F 3/041* | (2006.01) | |
| *G06K 9/00* | (2006.01) | |
| *G06K 9/62* | (2006.01) | |
| *G06F 3/043* | (2006.01) | |
| *G06F 3/044* | (2006.01) | |
| *G06F 3/02* | (2006.01) | |

(52) U.S. Cl.
CPC .............. *G06F 3/043* (2013.01); *G06F 3/044* (2013.01); *G06F 3/0412* (2013.01); *G06F 3/0414* (2013.01); *G06F 3/0421* (2013.01); *G06K 9/0002* (2013.01); *G06K 9/0004* (2013.01); *G06K 9/6293* (2013.01); *H04N 5/33* (2013.01); *G02F 2201/52* (2013.01); *G06F 2203/04106* (2013.01); *H01H 2219/066* (2013.01)

(56) References Cited

U.S. PATENT DOCUMENTS

| | | | |
|---|---|---|---|
| 5,751,059 | A | 5/1998 | Prost |
| 6,008,868 | A | 12/1999 | Silverbrook |
| 6,459,424 | B1 | 10/2002 | Resman |
| 6,634,554 | B1 | 10/2003 | Merchant |
| 6,859,196 | B2 | 2/2005 | Kehlstadt |
| 7,532,541 | B2 | 5/2009 | Govindswamy et al. |
| 8,193,685 | B2 | 6/2012 | Klee et al. |
| 8,201,739 | B2 | 6/2012 | Schneider et al. |
| 2003/0062490 | A1 | 4/2003 | Fujieda |
| 2004/0215072 | A1 | 10/2004 | Zhu |
| 2005/0083310 | A1 | 4/2005 | Safai et al. |
| 2005/0212916 | A1 | 9/2005 | Nakamura et al. |
| 2006/0017871 | A1 | 1/2006 | Morimoto et al. |
| 2006/0055642 | A1 | 3/2006 | Daughenbaugh et al. |
| 2006/0082549 | A1 | 4/2006 | Hoshino et al. |
| 2006/0114247 | A1 | 6/2006 | Brown |
| 2007/0008066 | A1 | 1/2007 | Fukuda |
| 2008/0122803 | A1 | 5/2008 | Izadi et al. |
| 2008/0231564 | A1* | 9/2008 | Harada et al. .................. 345/81 |
| 2008/0259051 | A1 | 10/2008 | Ota |
| 2008/0294315 | A1 | 11/2008 | Breed |
| 2008/0297487 | A1 | 12/2008 | Hotelling et al. |
| 2008/0309631 | A1 | 12/2008 | Westerman et al. |
| 2009/0027352 | A1 | 1/2009 | Abele |
| 2009/0146967 | A1* | 6/2009 | Ino et al. ....................... 345/173 |
| 2009/0295692 | A1 | 12/2009 | Lee et al. |
| 2009/0309616 | A1 | 12/2009 | Klinghult et al. |
| 2010/0097345 | A1 | 4/2010 | Jang et al. |
| 2010/0117970 | A1 | 5/2010 | Burstrom et al. |
| 2010/0156847 | A1 | 6/2010 | No et al. |
| 2010/0277040 | A1* | 11/2010 | Klee ...................... B06B 1/0292 310/324 |
| 2010/0309171 | A1 | 12/2010 | Hsieh et al. |
| 2011/0018893 | A1* | 1/2011 | Kim et al. .................... 345/589 |
| 2011/0080349 | A1 | 4/2011 | Holbein et al. |
| 2011/0080367 | A1 | 4/2011 | Marchand et al. |
| 2011/0122071 | A1 | 5/2011 | Powell |
| 2011/0153284 | A1 | 6/2011 | Li et al. |
| 2011/0157068 | A1 | 6/2011 | Parker et al. |
| 2011/0163976 | A1 | 7/2011 | Barnhoefer et al. |
| 2011/0215150 | A1* | 9/2011 | Schneider et al. ............. 235/439 |
| 2011/0250928 | A1 | 10/2011 | Schlub et al. |
| 2011/0267473 | A1* | 11/2011 | Kabasawa ............ G01J 5/0235 348/164 |
| 2012/0044093 | A1 | 2/2012 | Pala |
| 2012/0044444 | A1 | 2/2012 | Park et al. |
| 2012/0056835 | A1 | 3/2012 | Choo et al. |
| 2012/0068952 | A1 | 3/2012 | Slaby et al. |
| 2012/0127128 | A1 | 5/2012 | Large et al. |
| 2012/0127136 | A1 | 5/2012 | Schneider et al. |
| 2012/0147698 | A1 | 6/2012 | Wong et al. |
| 2012/0154324 | A1 | 6/2012 | Wright et al. |
| 2012/0200532 | A1 | 8/2012 | Powell et al. |
| 2012/0205646 | A1 | 8/2012 | Cho et al. |
| 2012/0268427 | A1 | 10/2012 | Slobodin |
| 2012/0274548 | A1 | 11/2012 | Molen |
| 2012/0281096 | A1 | 11/2012 | Gellaboina et al. |
| 2012/0327458 | A1 | 12/2012 | Baba et al. |
| 2013/0155031 | A1 | 6/2013 | Dahl et al. |
| 2013/0201134 | A1 | 8/2013 | Schneider et al. |
| 2014/0354608 | A1 | 12/2014 | Kitchens, II et al. |
| 2014/0354823 | A1 | 12/2014 | Kitchens et al. |
| 2014/0354905 | A1 | 12/2014 | Kitchens et al. |

FOREIGN PATENT DOCUMENTS

| | | |
|---|---|---|
| GB | 2478421 A | 9/2011 |
| JP | H04184823 A | 7/1992 |
| JP | H08272496 A | 10/1996 |
| KR | 100807622 B1 | 2/2008 |
| KR | 20130035110 A | 4/2013 |
| WO | 0110296 A2 | 2/2001 |
| WO | 2005024712 A1 | 3/2005 |
| WO | WO 2014197243 A2 | 12/2014 |
| WO | WO 2014197245 A1 | 12/2014 |
| WO | WO 2014197247 A1 | 12/2014 |
| WO | WO 2014197252 A2 | 12/2014 |

OTHER PUBLICATIONS

Aaron C. et al., "A low cost multi-wavelength tomography system based on LED sources", Optical Tomography and Spectroscopy of Tissue IX, SPIE, 1000 20th St. Bellingham WA 98225-6705 USA, vol. 7896, No. 1, Feb. 10, 2011, pp. 1-6, XP060007949.

Anonymous: Ultrasonic sensor—Wikipedia, the free encyclopedia . . , May 2, 2013, XP55133997, Retrieved from the Internet: URL:http://en.wikipedia.org/w/index.php?title=Ultrasonicsensor&oldid=553222621, [retrieved on Aug. 8, 2014] the whole document, pp. 1.

Cima L. et al., "Ferroelectric active sensors", Sensors and Actuators A, Elsevier Sequoia S.A., Lausanne, CH, vol. 119, No. 1, Mar. 28, 2005, pp. 120-127, XP027806833.

International Search Report and Written Opinion—PCT/US2014/039700—ISA/EPO—Aug. 1, 2014.

Liu J.C., et al., "A CMOS Micromachined Capacitive Sensor Array for Fingerprint Detection", IEEE Sensors Journal, IEEE Service Center, New York, NY, US, vol. 12, No. 5, May 1, 2012, pp. 1004-1010, XP011440782.

Partial International Search Report—PCT/US2014/039673—ISA/EPO—Sep. 25, 2014.

Pecora A., et al., "Flexible PVDF-TrFE pyroelectric Sensor Driven by Polysilicon Thin Film Transistor Fabricated on Ultra-Thin Polyimide Substrate", Sensors and Actuators A: Physical, 2012, vol. 185, pp. 39-43.

Zhu Q. et al., "Design of Near-Infrared Imaging Probe With the Assistance of Ultrasound Localization", Applied Optics, Optical Society of America, Washington, DC; US, vol. 40, No. 19, Jul. 1, 2001, pp. 3288-3303, XP001100250.

Zhu Q., "Imager That Combines Near-Infrared Diffusive Light and Ultrasound", Optics Letters, Optical Society of America, US, vol. 24, No. 15, Aug. 1, 1999, pp. 1050-1052, XP000859237.

Burgess D.E., "Pyroelectrics in a harsh environment", International Society for Optics and Photonics Orlando Technical Symposium, Jan. 1, 1988, pp. 139-150, XP055190428, [retrieved on May 20, 2015].

U.S. Office Action dated Jul. 16, 2015, issued in U.S. Appl. No. 14/137,439.

U.S. Final Office Action dated Feb. 2, 2016, issued in U.S. Appl. No. 14/137,439.

U.S. Office Action dated Jul. 16, 2015, issued in U.S. Appl. No. 14/137,474.

U.S. Final Office Action dated Dec. 24, 2015, issued in U.S. Appl. No. 14/137,474.

U.S. Notice of Allowance dated Mar. 11, 2016, issued in U.S. Appl. No. 14/137,474.

(56) References Cited

OTHER PUBLICATIONS

U.S. Office Action dated Aug. 5, 2015, issued in U.S. Appl. No. 14/137,489.
U.S. Final Office Action dated Feb. 25, 2016, issued in U.S. Appl. No. 14/137,489.
International Search Report—PCT/US2014/039673—ISA/EPO—Nov. 26, 2014.
International Written Opinion—PCT/US2014/039673—ISA/EPO—Nov. 26, 2014.
International Preliminary Report on Patentability—PCT/US2014/039673—ISA/EPO—May 20, 2015.
International Preliminary Report on Patentability—PCT/US2014/039700—ISA/EPO—Jul. 20, 2015.
International Search Report—PCT/US2014/039709—ISA/EPO—Nov. 17, 2014.
International Written Opinion—PCT/US2014/039709—ISA/EPO—Dec. 3, 2015.
International Preliminary Report on Patentability—PCT/US2014/039709—ISA/EPO—Dec. 17, 2015.
International Search Report—PCT/US2014/039747—ISA/EPO—Feb. 18, 2015.
International Written Opinion—PCT/US2014/039747—ISA/EPO—Dec. 3, 2015.
International Preliminary Report on Patentability—PCT/US2014/039747—ISA/EPO—Jul. 30, 2015.
European Office Action Dated Jun. 2, 2016 Issued in EP 14 733 853.7.
Dahiya, Ravinder et al., (Jul. 2009) "Piezoelectric oxide semiconductor field effect transistor touch sensing devices," Applied Physics Letters, A I P Publishing LLC, US, 95(3):34105, 3 pages.

* cited by examiner $$\text{US\_IMAGE} \equiv \begin{vmatrix} \text{GB} \leftarrow 255 \\ \text{GD} \leftarrow 0 \\ \text{for } r \in 0..\text{rows}(\text{FP})-1 \\ \quad \text{for } c \in 0..\text{cols}(\text{FP})-1 \\ \quad\quad \underline{\begin{array}{l} fp_{r,c} \leftarrow \text{GD} \\ fp_{r,c} \leftarrow \text{GB} + \text{floor}\left[\left[\left(\dfrac{\text{GB}-\text{GD}}{bf_{r,c}-df_{r,c}}\right)\left[(\text{FP}_{r,c}-bf_{r,c})-(\text{TC}_{r,c}-df_{r,c})\right]\text{con}\right] \text{ if } bf_{r,c} \neq df_{r,c} \right] \\ fp_{r,c} \leftarrow 0 \text{ if } fp_{r,c} < 0 \\ fp_{r,c} \leftarrow 255 \text{ if } fp_{r,c} < 255 \end{array}} \\ fp \end{vmatrix}$$

Fig. 6

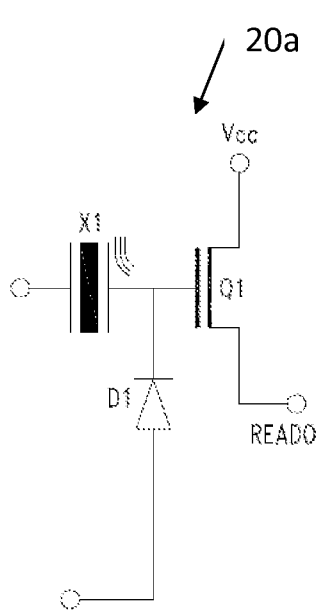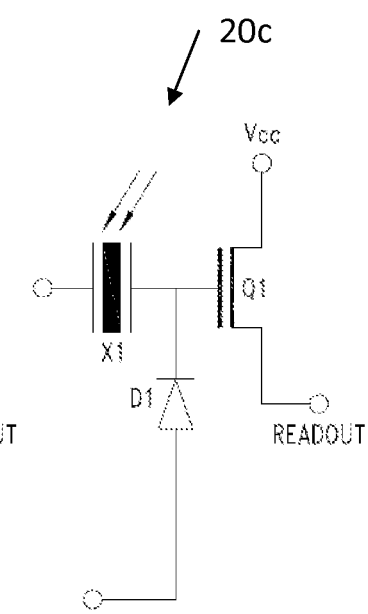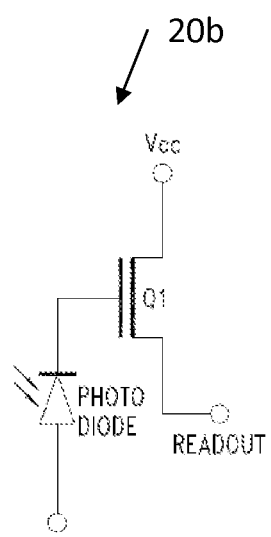
Fig. 15A          Fig. 15B          Fig. 15C
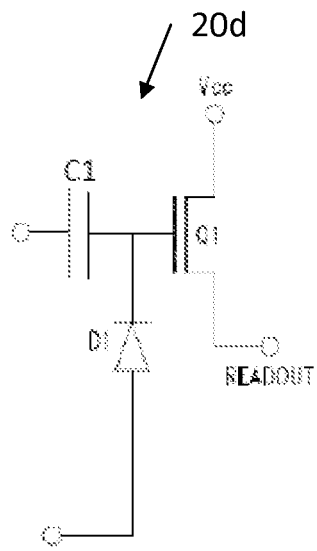
Fig. 15D

IN-CELL MULTIFUNCTIONAL PIXEL AND DISPLAY

CROSS-REFERENCE TO RELATED APPLICATIONS

This application claims the benefit of priority to U.S. provisional patent application Ser. No. 61/830,548 filed Jun. 3, 2013; U.S. provisional patent application Ser. No. 61/830,601 filed Jun. 3, 2013; and U.S. provisional patent application Ser. No. 61/830,606 filed Jun. 3, 2013, the disclosures of which are incorporated herein by reference.

FIELD OF THE DISCLOSURE

The present disclosure generally relates to a visual display that has one or more types of sensing devices embedded within pixels of the visual display.

BACKGROUND OF THE DISCLOSURE

Visual display technology has advanced such that visual displays are generally thin and flat with a high pixel density. Sensors associated with display-based devices are generally relegated to placement on the sides or back of the display device enclosure or around the periphery of the display, as placement in front of the display can occlude visibility of images shown on the display. For some types of sensors, such as sensor arrays including touch sensors and fingerprint sensors, it is desirable for the display and the sensor array to occupy the same space.

SUMMARY OF THE DISCLOSURE

This disclosure describes a multifunctional pixel. The multifunctional pixel may include a display pixel, a photoelectric sensor, and a second sensor. The second sensor may include one of the following: an ultrasonic sensor and an infrared sensor. The display pixel, the photoelectric sensor, and the second sensor may be located in the multifunctional pixel.

The multifunctional pixel may be combined with additional multifunctional pixels to form a multifunctional pixel display array. Such a multifunctional pixel display array may have a sensor resolution that is adjustable. One or more multifunctional pixels may be combined with display pixels not having sensors in order to form a display array.

BRIEF DESCRIPTION OF THE DRAWINGS

For a fuller understanding of the disclosure, reference should be made to the accompanying drawings and the subsequent description.

FIG. 6 depicts a block diagram of an ultrasonic sensor array that may be used with a display device including a multifunctional pixel display array;

FIGS. 14AA-14AE depict additional arrangements of sensors and sensor types within a multifunctional pixel; and FIGS. 15A-15D depict various sensors that can be used in conjunction with a multifunctional pixel.

DETAILED DESCRIPTION OF THE DISCLOSURE

Figure 1:
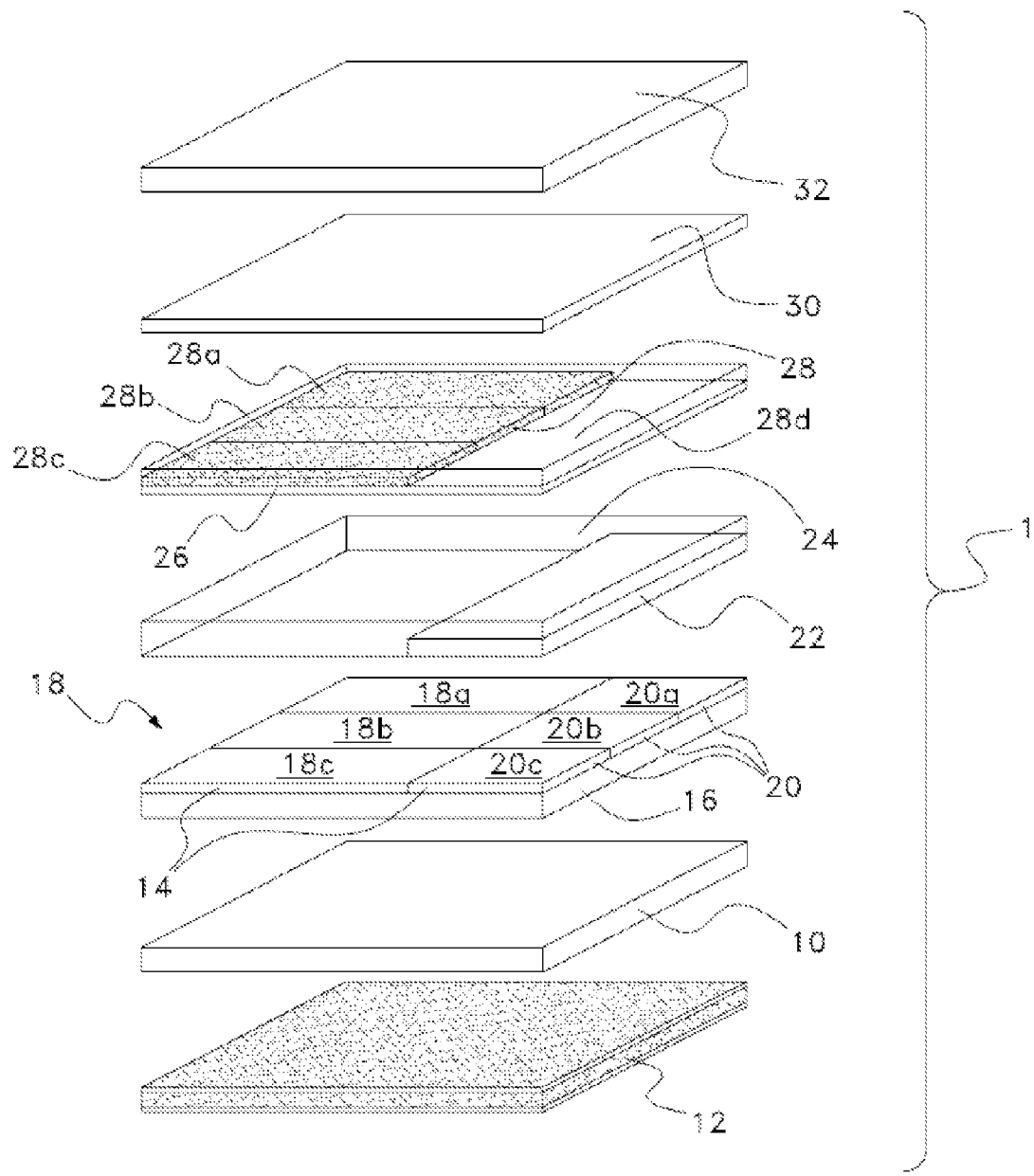
FIG. 1 is an exploded perspective view of a multifunctional pixel according to one embodiment of the present disclosure.

This disclosure describes an in-cell display device with sensing elements referred to herein as sensors positioned among display elements referred to herein as display pixels or sub-pixels, with the display pixels and sensors forming part of a visual display. As used herein, the phrase "in-cell" refers to one or more sensors physically located with display elements that collectively make up a multifunctional pixel for a visual display device. Such an arrangement results in a multifunctional pixel generally having one or more display sub-pixels for producing color (e.g. red, green and blue, or red, green, blue and yellow) and one or more sensors, such as a photoelectric sensor (which may be an optical light sensor or an infrared light sensor) that may also be referred to as a photodetector or a photonic sensor, an ultrasonic sensor (which may be an acoustic sensor for detecting sound or acoustic emissions), a piezoelectric sensor (which may be an ultrasonic sensor, a force sensor, a pressure sensor, a thermal sensor, an acoustic sensor or an acoustic emission sensor), a pyroelectric sensor (which may be an infrared sensor or a thermal sensor sometimes referred to as a heat sensor), or a capacitive sensor, one or more of which may be used to detect objects near to or in contact with the visual display. Such a pixel is referred to herein as a multifunctional pixel or "super pixel" because it includes more components and functionality than a display pixel. An optical light sensor may detect visible light in a band of wavelengths substantially between about 400 nm (nanometers) and about 700 nm. An infrared light sensor may detect near-infrared light in a band of wavelengths substantially between about 700 nm and about 1400 nm. A pyroelectric sensor, referred to herein as an infrared sensor, may detect infrared, thermal or heat energy.

Combining visual display technology with one or more sensors offers advantages, such as the ability to provide touchscreen operation by use of a finger, stylus or other object positioned on or near the visual display, or to acquire fingerprint information from a finger placed on the display or other biometric information. A particular type of sensor that may be used is an ultrasonic sensor. With an ultrasonic sensor, biometric information about a biological object, such as a fingerprint including fingerprint ridges and valleys, may be obtained. Ultrasonic sensors are able to capture information about a fingerprint by emitting an ultrasonic pulse towards a finger positioned on a surface of a platen, which may be a cover glass of a display, and detecting ultrasonic energy reflected from the platen surface.

The combination of ultrasonic sensor and visual display technologies offers the advantage of touchpad or touchscreen operation directly on the visual display surface. A high-resolution fingerprint imaging may be performed with a finger positioned directly on a display (e.g. a platen) having an array or sub-array of multifunctional pixels. A stylus or stylus tip may be detected when positioned on or near the multifunctional pixel. Various sensing technologies may be included in the multifunctional pixel, such as piezoelectric sensors, pyroelectric sensors, photoelectric sensors, or capacitive sensors. The multifunctional pixel may include a display pixel and a capacitive sensor. The capacitive sensor may detect, for example, the presence of a finger or other object capacitively. The photoelectric sensor may detect, for example, a visible light emission from a laser pointer that is directed at a display device. The photoelectric sensor may detect, for example, signals from an infrared remote control device. The infrared sensor may detect, for example, signals from an infrared remote control device or an infrared light source such as an infrared laser pointer.

The ultrasonic sensor, photoelectric sensor, infrared light sensor, pyroelectric infrared sensor, or capacitive sensor may be used to detect various gestures of hands or other objects that are near to or on the multifunctional pixel or display array. Further advantages may be achieved by using a combination of sensor types in some or all of the multifunctional pixels. For example, some of the multifunctional pixels in a sensor array may have an ultrasonic sensor, some may have a pyroelectric sensor, some may have a photoelectric sensor, some may have an infrared sensor, and some may have a capacitive sensor. Or, a multifunctional pixel may have two or more types of sensors. For example, the multifunctional pixel may include a display pixel, a photoelectric sensor for detecting optical or infrared light, an infrared sensor for detecting infrared or thermal energy, and an ultrasonic sensor for detecting ultrasonic or acoustic energy. The multifunctional pixel may include a display pixel, a photoelectric sensor, and an infrared sensor. The multifunctional pixel may include a display pixel, a photoelectric sensor, and a capacitive sensor. The multifunctional pixel may include a display pixel, an ultrasonic sensor, and a thermal sensor. A display pixel and a capacitive sensor may be combined with one or more additional sensors in the multifunctional pixel, such as a photoelectric sensor, an ultrasonic sensor, an acoustic emission sensor, a piezoelectric sensor (for detecting ultrasonic energy, force, pressure, thermal energy, acoustic energy, or acoustic emissions), or an infrared sensor (for detecting infrared or thermal energy). A display pixel and a photoelectric sensor (optical light or infrared light) may be combined with one or more additional sensors, such as a second photoelectric sensor (optical or infrared), an ultrasonic sensor, a piezoelectric sensor, an infrared sensor, or a capacitive sensor. A display pixel and an ultrasonic sensor may be combined with one or more additional sensors such as a photoelectric sensor, a piezoelectric sensor, an infrared sensor, or a capacitive sensor. A display pixel and an infrared sensor may be combined with one or more additional sensors such as an ultrasonic sensor, a piezoelectric sensor, or a capacitive sensor. Other combinations of the aforementioned sensors may be positioned within the multifunctional pixel. The display pixel, the photoelectric sensor, and the ultrasonic sensor or other combinations of display pixels and sensors of the multifunctional pixel may be located, positioned or otherwise disposed on a common substrate. The display pixel, the photoelectric sensor, and the ultrasonic sensor or other combinations of display pixels and sensors may lie substantially in a plane. In some embodiments, the ultrasonic sensor having a piezoelectric layer may also serve as an infrared sensor, as the piezoelectric layer may also perform as a pyroelectric layer to absorb infrared energy and detect heat.

In the context of this document it is recognized that a piezoelectric material may also exhibit pyroelectric properties. Therefore, when the term "piezoelectric" is used herein, it is implied that the material or device may also exhibit pyroelectric properties.

The present disclosure describes a multifunctional pixel device having: (a) at least one sensor, such as an ultrasonic, acoustic, piezoelectric, force, pressure, photoelectric, infrared light, optical light, infrared, pyroelectric, thermal, or capacitive sensor; and (b) a light-emitting or light-controlling display pixel, such as three sub-pixels (red, green and blue) of an LCD or OLED display pixel. For example, such a device may be thought of as a visual display pixel having red, green and blue sub-pixels that is augmented by one or more sensors such as an ultrasonic sensor, an infrared sensor, a photoelectric sensor, a piezoelectric sensor, a pyroelectric sensor, or a capacitive sensor so that the resulting multifunctional pixel has a display pixel and one or more sensors. This configuration can be used to display visual information while also collecting touch or contact information regarding an object that may be in contact with the display. If the display is used as part of a cell phone, a smart phone or other mobile device, then the touch or contact information provided by the sensors may be related to biometric information such as a fingerprint, an ear print, or the side of a user's face that is in contact with the display. The display may be able to detect objects that are spaced away from the outer display surface. In this manner, information may be obtained from objects that are not in contact with the display surface, but are near enough to the display to be detected by one or more of the sensors. A multifunctional pixel display array may be able to detect gestures of an object such as a hand or finger that is on or near the display array. The examples provided here are merely a limited number of the possible applications of the teachings. The teachings herein can be applied in a variety of different ways.

The described embodiments may be implemented in a device that is configured to display an image (e.g., a still image) or a plurality of sequential images (e.g., a video), whether the image(s) be text, graphics, or pictures. More particularly, it is contemplated that the teachings herein may be implemented in or associated with a variety of electronic devices such as, but not limited to, mobile devices, display devices, telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, medical devices, wearable electronic devices, mobile health devices, wrist watches, clocks, calculators, television monitors, flat panel displays, electronic reading devices (e.g., e-readers), computer monitors, automobile displays (e.g., odometer displays, etc.), cockpit controls and/or displays, camera view displays (e.g., display of a rear view camera in a vehicle), or automatic teller machines. Thus, the teachings herein are not intended to be limited to the implementations depicted solely in the figures, but instead have wide applicability as will be readily apparent to a person having ordinary skill in the art.

FIG. 1 is an exploded perspective view of a multifunctional pixel according to one embodiment of the present disclosure. The multifunctional pixel 1 may be used to form a touch-enabled, stylus-enabled, or fingerprint-enabled liquid-crystal display (LCD) device. The multifunctional pixel 1 may include an edge-lit backlight panel 10 attached to a piezoelectric film ultrasonic transmitter 12 having a piezoelectric film or layer sandwiched between two conductive electrodes. On the surface of the backlight panel 10 opposite the ultrasonic transmitter 12, a thin-film transistor (TFT) array 14 on a glass or plastic TFT substrate 16 may be attached. The TFT array 14 can be constructed of one or more circuits and sub-circuits. The multifunctional pixel 1 may include an LCD display pixel 18 with one or more LCD display sub-pixels 18a-c and a plurality of sensors 20. The display sub-pixels 18a-c may correspond to red, green and blue color sub-pixels, respectively. In some implementations, sensor 20a may be an ultrasonic sensor, sensor 20b may be a photoelectric sensor, and sensor 20c may be an infrared sensor. Sensors 20, including an ultrasonic sensor 20a or an infrared sensor 20c, may be associated with a layer of piezoelectric polymer 22 that is bonded to or otherwise disposed on a conductive pad that serves as a pixel input electrode on the TFT array 14, for example, to a field-effect transistor (FET) input of the associated sensor circuit. An ultrasonic sensor 20a with the piezoelectric polymer 22 may also act as an infrared or thermal sensor. For example, the piezoelectric polymer 22 may be used as part of an infrared sensor if the piezoelectric polymer 22 exhibits pyroelectric properties. In that manner, the ultrasonic sensor 20a can be used to detect ultrasonic and infrared signals.

The sensors 20 may include one or more sensor circuits and sub-circuits such as an ultrasonic sensor circuit, an acoustic sensor circuit, a piezoelectric sensor circuit, a piezoelectric force sensor circuit, a piezoelectric pressure sensor circuit, a photoelectric circuit, a light sensor circuit, an infrared light sensor circuit, a pyroelectric sensor circuit, a thermal sensor circuit, or a capacitive sensor circuit. Sensors 20, such as a photoelectric sensor 20b, may use a PIN diode to receive optical or infrared light and convert it to a charge. An optical filter that blocks infrared light (not shown) or an infrared filter than blocks visible light (not shown) may be positioned over the PIN diode to sense optical light or infrared light, respectively. In some implementations, the piezoelectric polymer 22 may be sufficiently optically transparent that it can be positioned above the photoelectric sensor circuit without substantially affecting the photoelectric sensor circuit's ability to receive light. In other implementations, the piezoelectric polymer 22 may be disposed in a manner so as not to overlay the photoelectric sensor circuit. For example, in such an arrangement the piezoelectric polymer 22 may not reside between the photoelectric sensor circuit and the platen 32. A capacitive sensor may have a sensor input electrode electrically connected to, for example, a charge amplifier, an integrator, or other capacitance sensing circuit for the detection of capacitance values.

In another embodiment, a piezoelectric polymer 22 may overlay the capacitive sensor. The piezoelectric layer may serve as a dielectric layer for the input to the capacitive sensor. The piezoelectric layer may also serve as a dielectric isolation layer for the capacitive sensor to minimize the potential for dielectric breakdown. The TCF electrode layers 21, and/or 23 may be omitted above the capacitive sensor. Alternatively, the TCF electrode layers 21, 23 may be patterned and etched around the periphery of the capacitive sensor to electrically isolate the electrodes. In some implementations, a piezoelectric layer such as a piezoelectric polymer 22 may be included as part of an ultrasonic sensor, a piezoelectric sensor, a pyroelectric (infrared or thermal) sensor, and/or a capacitive sensor. In some implementations, the piezoelectric layer may overlay a photoelectric light sensor (optical light or infrared light), as some piezoelectric layers such as a layer of polyyinylidene fluoride (PVDF) or polyvinylidene-trifluoroethylene (PVDF-TrFE) copolymers are substantially transparent in the visible and infrared spectral regions. In some implementations, the PVDF or PVDF-TrFE layer may be included over the LCD or OLED display elements. As illustrated in FIG. 1, substantial portions of the display pixel 18 and the sensors 20 may be positioned or otherwise disposed on a common substrate. Substantial portions of the display pixel 18 and the sensors 20 may lie in substantially the same plane.

FIG. 1 shows a layer of liquid crystal material 24 on the TFT array 14 above the circuitry for the display pixel and sub-pixels. The liquid crystal material 24, in some implementations, may extend over the sensor circuits. By controlling the voltage applied across the liquid crystal material 24, light from the backlight panel 10 can be allowed to pass through the display pixels in varying amounts. The piezoelectric polymer 22 may be circumscribed by, or partially circumscribed by the liquid crystal material, above, and/or below the liquid crystal material 24. FIG. 1, for example, shows a portion of the layer of liquid crystal material 24 as being above the piezoelectric polymer 22, and shows another portion of the liquid crystal material beside the piezoelectric polymer 22. In some implementations, a thin layer or coating of polyimide (not shown) may be positioned between the piezoelectric polymer 22 and the liquid crystal material 24 to aid in proper orientation of the liquid crystal material.

FIG. 1 also depicts a transparent conducting film (TCF) electrode 26 positioned above the liquid crystal material 24. The TCF electrode 26 may be formed from materials such as ITO (indium tin oxide), IZO (indium zinc oxide), FTO (fluorinated tin oxide), GZO (gallium zinc oxide), PEDOT or poly(3,4-ethylenedioxythiophene), or other conductive materials that are substantially transparent and can be used as electrically conductive films. An ITO layer, for example, may be included as part of a color filter array 28 and serve as a TCF electrode 26 for the ultrasonic sensors 20a. TCF electrodes 26 for the ultrasonic sensors 20a may also be referred to as a receiver bias electrode.

The TCF electrode 26 may be used as a common electrode for the sensors 20 and the display pixel 18. In the example shown in FIG. 1, the TCF electrode 26 may be affixed to the color filter array 28. The color filter array 28 may include three individual color filter elements 28a, 28b and 28c corresponding to, for example, red, green and blue color filters for each display pixel. The color filter elements 28a, 28b and 28c may be formed or otherwise disposed on a color filter substrate 28d, such as a glass or plastic layer. Above the color filter array 28 may be a polarizing filter 30. A platen 32 can be provided as an outermost protective layer, which may also serve as a cover glass or cover lens. The platen 32 may be made of a layer of scuff-resistant glass or plastic.

The visual aspects of such a display may operate in a fashion similar to most LCD displays. A voltage between the TFT array 14 and the TCF electrodes 26 allows each display sub-pixel 18a, 18b and 18c to turn on or off. Each display pixel 18 may have a black matrix also known as a black mask (not shown) that surrounds the individual sub-pixels 18a, 18b and 18c so as to exclude unwanted light from the backlight panel 10 that may leak through the space between individual display sub-pixels 18a, 18b and 18c. The black mask may be positioned as part of the sensor stack, such as above or below the ultrasonic sensor 20a or other sensors, to reduce the amount of light from the backlight panel 10 passing through the sensors and improve the dark state behavior of the display. A black mask may be used with other display types such as emissive displays and reflective displays to increase the contrast ratio of the display. A reflective layer (not shown) may be positioned under the ultrasonic sensor 20a or other sensors, to redirect light from the backlight panel 10 back towards the backlight and increase lighting efficiency.

Figure 2A:
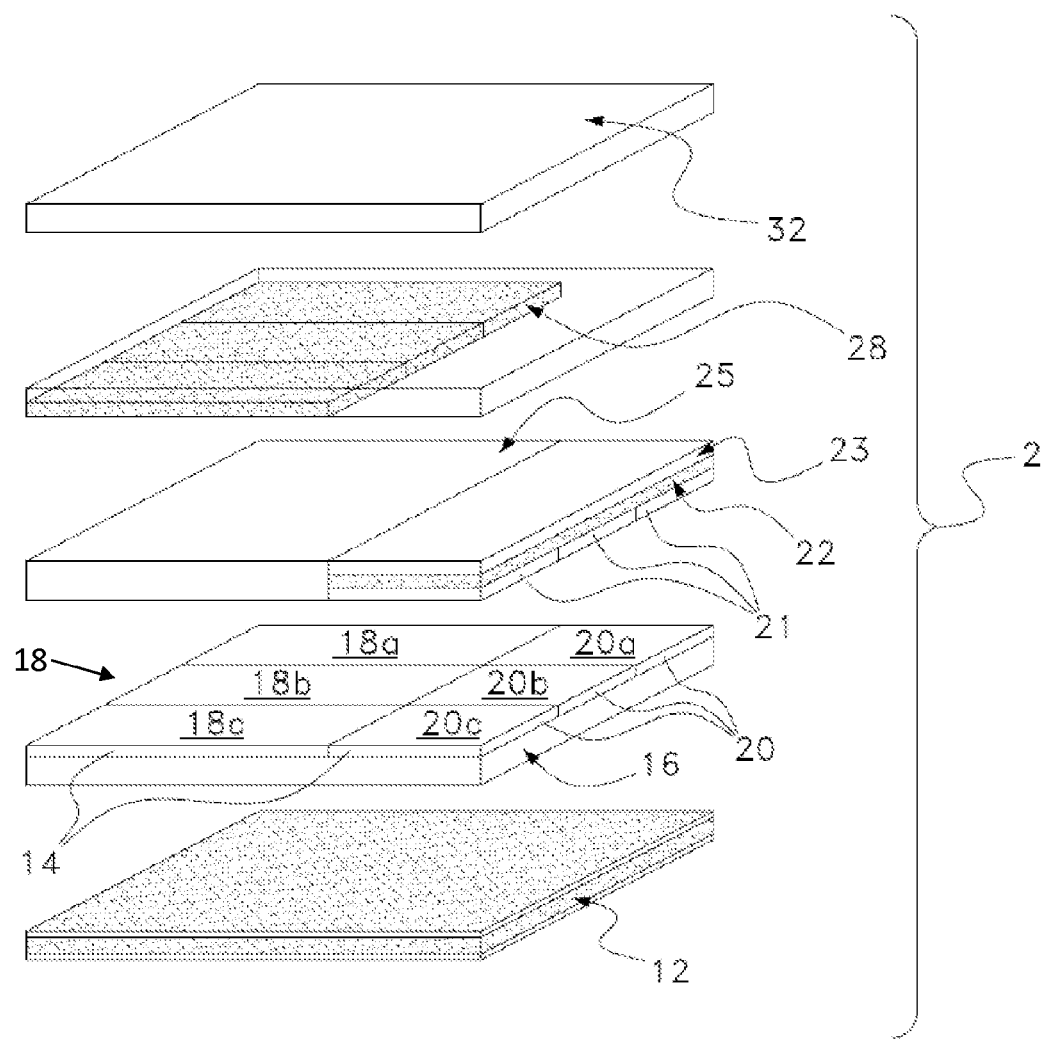
FIG. 2A-2C are exploded perspective views of other embodiments of a multifunctional pixel.
Figure 2B:
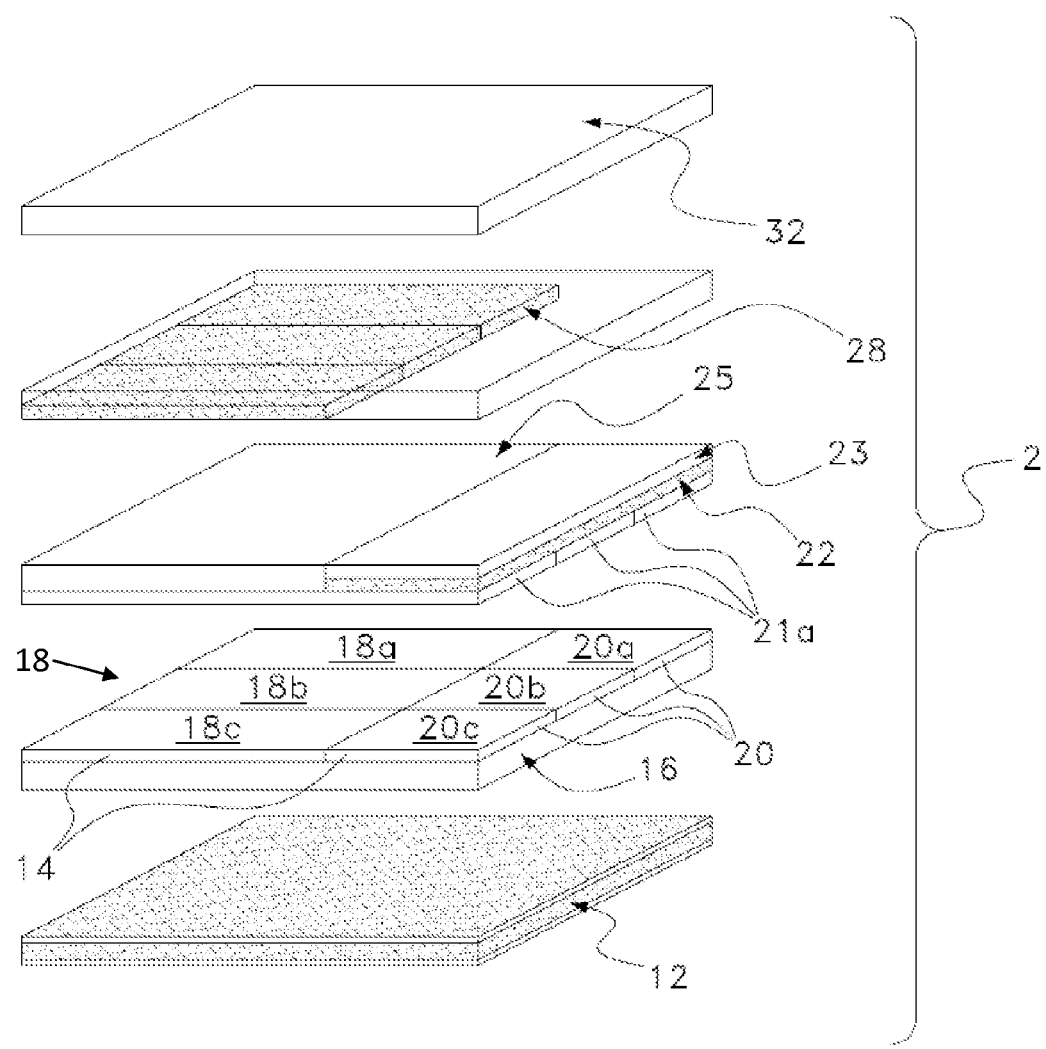
Figure 2C:
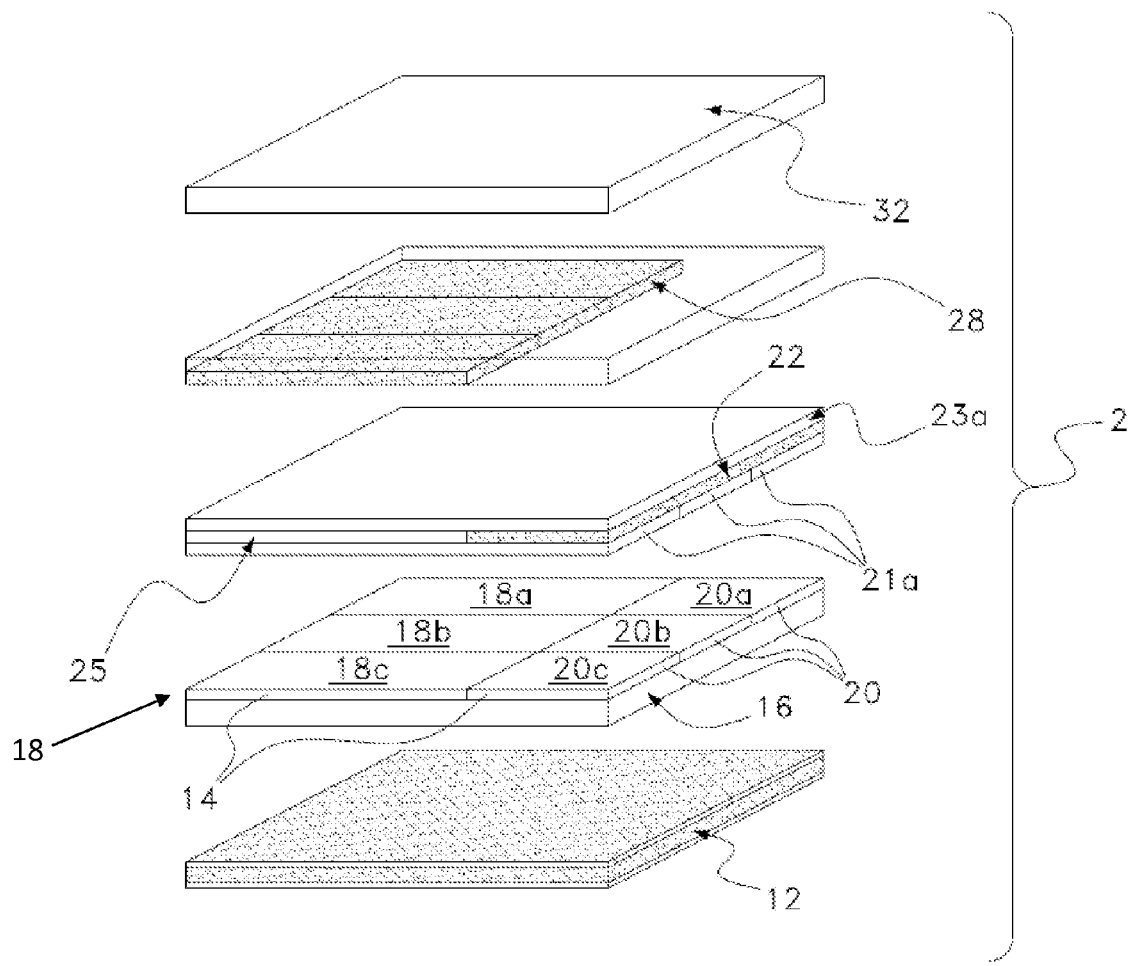

FIGS. 2A-2C are exploded perspective views of other embodiments of a multifunctional pixel. In these embodiments, OLED sub-pixels are combined to form the display pixel 18. The multifunctional pixel 2 may have a plurality of sensors 20 and a display pixel 18 with one or more OLED display sub-pixels 18a, 18b and 18c. A piezoelectric film ultrasonic transmitter 12 may be attached to the back of TFT substrate 16 of the TFT array 14. The TFT array 14 may include a display pixel 18 with one or more light emitting display pixels or display sub-pixels 18a, 18b and 18c. As shown in FIG. 2A, a first TCF electrode 21, a layer of piezoelectric polymer 22, and a second TCF electrode 23 may be positioned above associated sensor circuits, but not be positioned above display sub-pixels 18a, 18b, and 18c. In another embodiment, shown in FIG. 2B, first TCF electrode layer 21a may be disposed above the sensor circuits and above display sub-pixels 18a, 18b, and 18c. In a third embodiment, depicted in FIG. 2C, the first TCF electrode 21a and the second TCF electrode 23a may be disposed above the sensor circuits and above display sub-pixels 18a, 18b, and 18c.

Optically transparent insulating material 25 is shown in FIGS. 2A-2C above three OLED display sub-pixels 18a-c. In the embodiment shown in FIG. 2A, the insulating material 25 may isolate the OLED display sub-pixels 18a-c from the TCF electrodes 21 and 23. In the embodiments shown in FIGS. 2B-2C, the insulating material 25 may isolate the OLED display sub-pixels 18a-c from the TCF electrode 23.

A color filter array 28 may be provided to allow the red-green-blue visual display colors. A cover glass that may serve as a platen 32 may be provided to protect the display device against physical abrasion and mechanical damage. Each display pixel 18 may have a black matrix or black mask (not shown) that surrounds the individual sub-pixels so as to exclude unwanted light from neighboring OLED sub-pixels that may leak through any spaces between individual display sub-pixels 18a, 18b and 18c.

The sensors 20 may include one or more sensor circuits and sub-circuits such as an ultrasonic sensor circuit, an acoustic sensor circuit, a piezoelectric sensor circuit, a piezoelectric force sensor circuit, a piezoelectric pressure sensor circuit, a photoelectric sensor circuit, an optical light sensor circuit, an infrared light sensor circuit, a pyroelectric infrared sensor circuit, a thermal sensor circuit, or a capacitive sensor circuit. For example, sensor 20a may be an ultrasonic sensor that includes an ultrasonic sensor circuit, sensor 20b may be a photoelectric sensor that includes a photoelectric sensor circuit, and sensor 20c may be an infrared sensor that includes an infrared sensor circuit. In some embodiments, the piezoelectric ultrasonic sensor circuit and the pyroelectric infrared sensor circuit may be similar in many regards with the use of a peak detector, a biasing circuit and a piezoelectric/pyroelectric layer, although the external biasing and timing circuit (described in more detail with respect to FIGS. 14A and 14B) may use a timing window to detect reflected ultrasonic signals for the ultrasonic sensor and no timing window (and no ultrasonic transmitter activity) for detecting thermal or infrared energy. The photoelectric sensor circuit of the photoelectric sensor 20b may be formed by substituting a peak detecting diode and capacitor, used in some implementations of the ultrasonic or infrared sensors, with a PIN-type photodiode. PIN-type photodiodes can convert optical or infrared light to charge directly. Once available as charge, the TFT array circuitry may be used to output a signal via row and column addressing circuitry associated with the TFT array.

A person having ordinary skill in the art will recognize that the various layers comprising the sensor circuits and portions of the sensors could be situated on different layers within the display stack and still achieve the same or similar function. Thus, the particular arrangements described herein should not be viewed as the only arrangements in which the in-cell technology can be implemented.

Figure 3A:
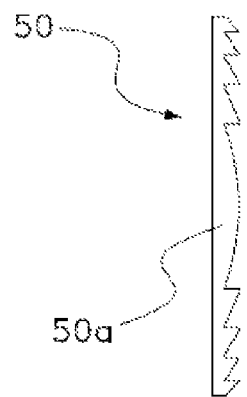
FIGS. 3A-3C depict light and/or acoustic lenses that may be used with a multifunctional pixel or pixel display array.
Figure 3B:
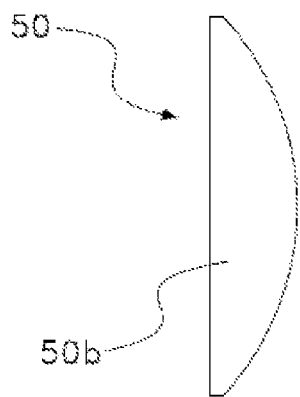
Figure 3C:
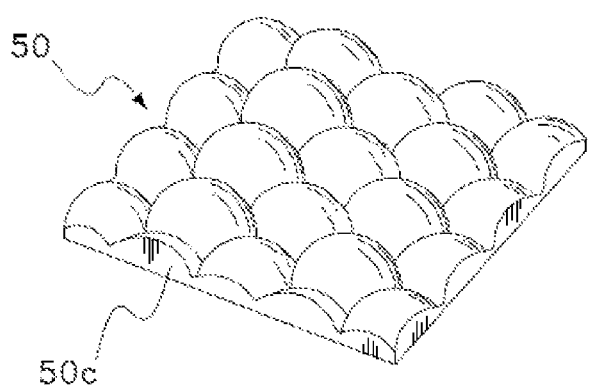

FIGS. 3A-3C depict refractive light and/or acoustic lenses that may be used with a multifunctional pixel or pixel display array. The multifunctional pixel 1, 2 described above may include one or more lenses configured to focus energy from a particular location on or away from the display onto one or more of the sensors 20. The lens may be an optical lens configured to focus infrared or optical energy or may be an ultrasonic lens configured to focus ultrasonic energy. If an optical lens is provided, it is possible to focus infrared energy without affecting the piezoelectric device's ability to transmit or receive ultrasonic energy. It should be recognized, however, that providing an optical lens to focus infrared energy being sensed by the piezoelectric device can distort an image being produced by the visual display.

FIGS. 3A-3C depict refractive light and/or acoustic lenses that may be used with the multifunctional pixel. The multifunctional pixel 1, 2 described above may include one or more lenses configured to focus energy from a particular location on or away from the display onto one or more of the sensors 20. The lens may be an optical lens configured to focus infrared or optical energy or may be an ultrasonic lens configured to focus ultrasonic energy. If an optical lens is provided, it is possible to focus infrared energy without affecting the piezoelectric device's ability to transmit or receive ultrasonic energy. It should be recognized, however, that providing an optical lens to focus infrared energy being sensed by the piezoelectric device can distort an image being produced by the visual display.

Examples of lenses 50 are shown in FIGS. 3A-3C. For example, the lens 50 may be a Fresnel lens 50a (shown in FIG. 3A), a plano-convex optical lens 50b (shown in FIG. 3B), or a micro-lens array 50c (shown in FIG. 3C). The lens 50 may be used to focus the sensor to approximately infinity. In one example, an optical lens may be provided that is approximately ½ inch long by ½ inch wide, and have a thickness between 1/50 inch and 1/16 inch thick. However, other sized lenses are within the scope of the present disclosure. It is also contemplated that the lens 50 may be embodied as a plurality of optically aligned lenses (not shown). Such a plurality of lenses may be fixed or movable relative to one another.

Figure 4:
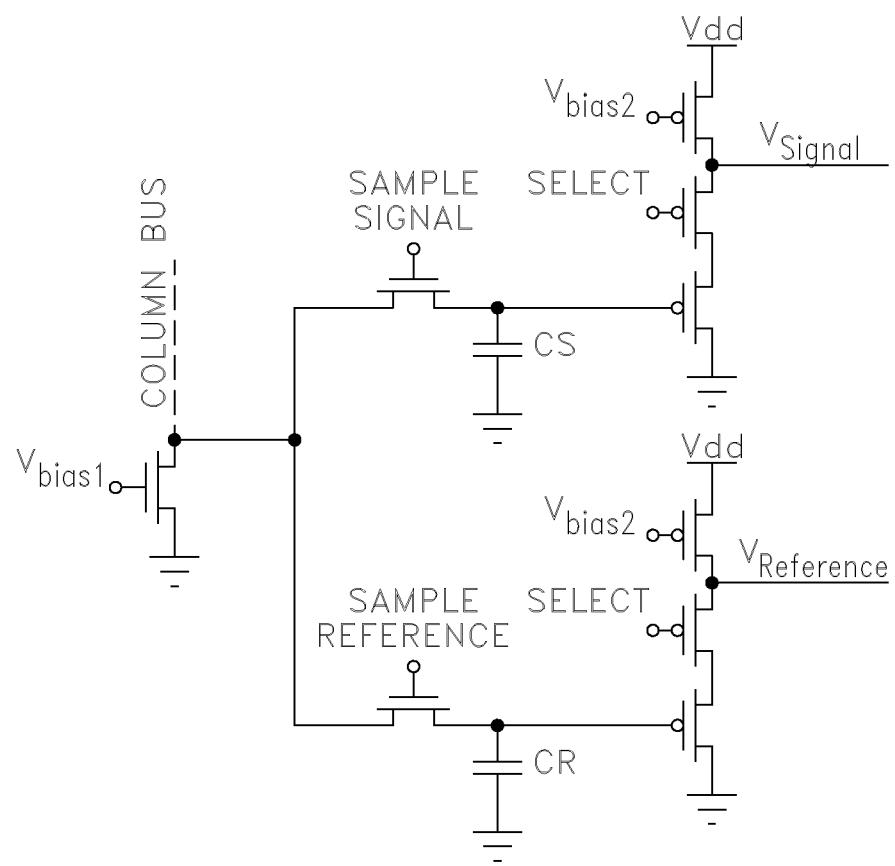
FIGS. 4A-4D depict platen and lens arrangements combined with a multifunctional pixel device.

FIGS. 4A-4D depict platen and lens arrangements combined with a multifunctional pixel device 36. An optical or acoustic lens 50 may be integrated into or onto one or more layers of a multifunctional pixel 1, 2 of a multifunctional pixel device 36. For example, the lens 50 may be positioned between the sensors 20 and the platen 32. In some implementations, the platen 32 may include a lens or serve as a lens. FIG. 4A depicts an arrangement having a substantially planar platen 32, and in this arrangement the sensors 20 of the multifunctional pixel 1, 2 may detect energy emitting or reflected from an object positioned on the exposed surface of the platen 32. FIGS. 4B and 4C depict embodiments where the outermost surface of a platen 32a has a curved surface, which may act as a lens. For example, FIG. 4B has a convex platen 32a, which can serve as an optical or infrared lens. FIG. 4B shows a finger 34 pressed against the convex platen 32a for sensing the finger 34 with the multifunctional pixel 1, 2. If such a multifunctional pixel 1, 2 includes an ultrasonic sensor 20a, an ultrasonic image may be taken of the finger 34 in FIG. 4B. An ultrasonic image taken by the arrangement shown in FIG. 4B may be substantially similar to the ultrasonic image taken by the embodiment shown in FIG. 4A. FIG. 4C shows a finger 34 spaced away from a convex platen 32a. This convex platen 32a can focus ultrasonic energy or infrared energy onto one or more multifunctional pixels 1, 2 to obtain a focused image of the finger 34 when the finger 34 is at a position away from and separated from the outer surface of the convex platen 32a. In this manner, an image of an object, such as the finger 34, can be taken with an optical or infrared sensor array without adding an additional layer to the multifunctional pixel 1, 2. In the context of the present disclosure, the term "image" includes data embodied as stored data representing an image of an object, as well as stored data derived from an imaging sensor.

The lens can also be distinct from the multifunctional pixel device 36. For example, FIG. 4D shows a multifunctional pixel device 36 with a Fresnel lens 50a positioned above or affixed to a planar platen. Alternatively, the Fresnel lens 50a may be formed monolithically with the platen. Although a Fresnel lens 50a is shown, any suitable lens may be used. The lens 50a can focus infrared or optical energy onto an infrared or photoelectric sensor to obtain a focused image of the finger 34 at a position away from the platen. Although the lens 50a may be fixed to the platen, the lens 50a may be displaceable relative to the multifunctional pixel device 36. For example, the lens 50a may be provided to slide into position, or be detachable from the multifunctional pixel device 36.

The convex platen 32a shown in FIGS. 4B and 4C may be advantageous for use as a button. The button may be an input for a computer device such as an automatic teller machine, a phone, a tablet computer, or the like. The button may be fixed in position or displaceable for registering an input from a user. In the case of a fixed button, the button may be configured to sense pressure, or determine a user's input with the sensors of the multifunctional pixel 1, 2. The button can include a plurality of multifunctional pixels 1, 2 arranged in an array. A planar platen 32 may be used as a button in the same manner described above. In some implementations, the curved shape of the convex platen 32a may be helpful to a user for differentiating the button from other areas of a device, including other buttons.

If an optical lens is not provided, it may be difficult to obtain a detailed image of an object that is spaced away from the platen. For example, it may be difficult to obtain an optical or infrared image that has the requisite detail to provide meaningful biometric information beyond 6 mm or so from the platen. However, an optical or infrared image taken without an optical lens may provide sufficient information to determine the existence of an object or movement of an object that is spaced away from the platen surface. For example, motion of an object may be sensed in a range of about 0.01" to about 2.0" without a lens. Other ranges may be obtained depending on the sensor(s) provided in the multifunctional pixel 1, 2 or the object being sensed.

Figure 5:
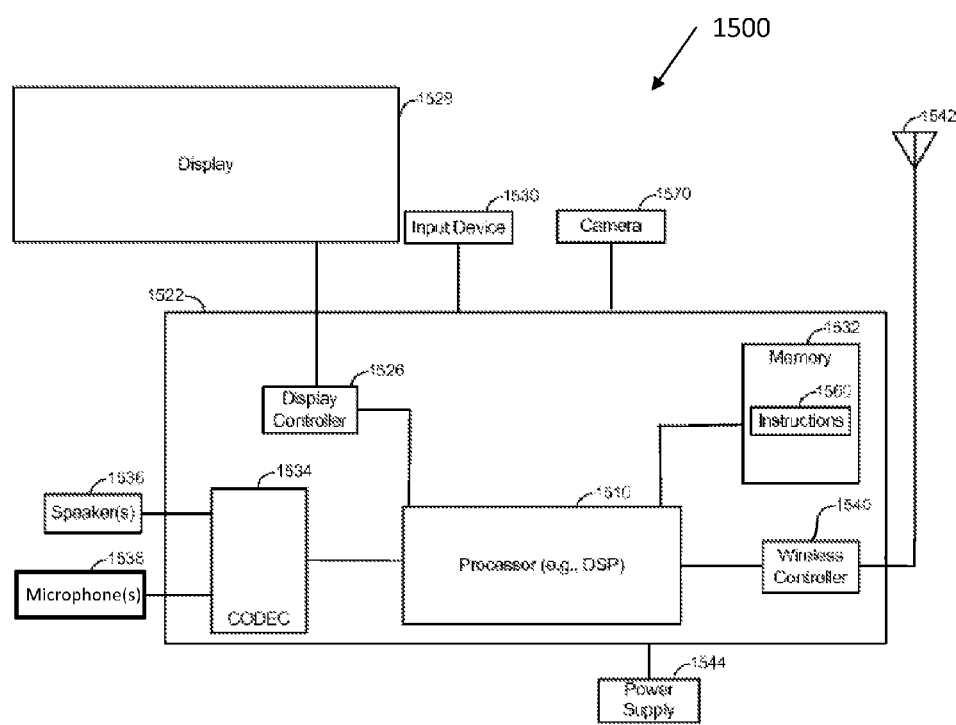
FIG. 5 depicts a block diagram of an illustrative embodiment of a mobile device.

One or more multifunctional pixels 1, 2 described above may be included in a mobile device such as a medical device or a consumer device such as a mobile phone. FIG. 5 depicts a block diagram of an illustrative embodiment of a mobile device, which is generally designated 1500. The device 1500 may include a microprocessor 1510, such as a digital signal processor (DSP) or a microcontroller, coupled to a memory 1532. In an illustrative example, the microprocessor 1510 includes image processing logic configured to identify features of captured images or image information. The microprocessor 1510 may be operable to perform various tasks assigned to the mobile device. In a particular embodiment, the memory 1532 may be a non-transitory computer readable medium that includes instructions 1560. The microprocessor 1510 may be configured to execute the instructions 1560 stored in the memory 1532 in order to perform tasks assigned to the mobile device. In another illustrative example, the memory 1532 may store optical images captured by a camera 1570.

Mobile device 1500 may also include a display controller 1526 coupled to the microprocessor 1510 and to a display device 1528. The display device 1528 may correspond to the in-cell display device depicted in FIG. 1 or FIGS. 2A-2C having one or more multifunctional pixels 1, 2. A coder/decoder (CODEC) 1534 may be coupled to the microprocessor 1510. One or more speakers 1536 and microphones 1538 may be coupled to the CODEC 1534. In a particular embodiment, the microphone 1538 may be configured to capture audio. The microphone 1538 may be configured to capture audio while the camera 1570 captures video.

A wireless controller 1540 may be coupled to the microprocessor 1510 and to an antenna 1542. In a particular embodiment, the microprocessor 1510, the display controller 1526, the memory 1532, the CODEC 1534, and the wireless controller 1540 are included in a system-in-package or system-on-chip (SOC) device 1522. In a particular embodiment, an input device 1530 and a power supply 1544 may be coupled to the system-on-chip device 1522. In an illustrative example in which the mobile device 1500 includes a touch-screen, the display device 1528 and the input device 1530 may be at least partially integrated using an in-cell system having one or more multifunctional pixels 1, 2. In a particular embodiment, as illustrated in FIG. 5, the display device 1528, the input device 1530, the speakers 1536, the microphones 1538, the antenna 1542, the power supply 1544, and the camera 1570 are external to the system-on-chip device 1522. However, each of the display device 1528, the input device 1530, the speakers 1536, the microphones 1538, the antenna 1542, the power supply 1544, and the camera 1570 may be coupled to a component of the system-on-chip device 1522, such as an interface or an embedded microcontroller.

When equipped with an ultrasonic sensor, a display device 1528 including one or more multifunctional pixels 1, 2 may include a piezoelectric film ultrasonic transmitter 12. During operation, the ultrasonic transmitter 12 may emit an ultrasonic pulse that may travel through the various layers of the multifunctional pixel 1, 2 toward and through the platen 32. An object residing on the platen 32, such as finger 34, may absorb some of the ultrasonic energy, and some of the ultrasonic energy that is not absorbed by the object may be reflected back through the platen 32 to the ultrasonic sensor 20a. By noting the signals that ultrasonic sensor 20a receives, information about the object may be determined.

For example, if the object is a finger 34, the information derived from the ultrasonic sensors may enable the creation of a visual representation of the fingerprint. Conductive traces may connect the ultrasonic sensor circuits of the ultrasonic sensor 20a with electronics that allow for reading out signals produced by the ultrasonic sensors 20a.

FIG. 6 depicts a block diagram of an ultrasonic sensor system that may be used with a display device including a multifunctional pixel display array. FIG. 6 depicts circuitry 1600 associated with an ultrasonic sensor array 1601. A control unit 1610 may send signals to the ultrasonic sensor array 1601 to send an ultrasonic pulse via ultrasonic transmitter 1620. For example, control unit 1610 may send a transmitter excitation signal 1622 to transmitter driver 1624 to drive the ultrasonic transmitter 1620. The control unit 1610 may activate circuitry to read out signals provided by the ultrasonic sensor array 1601. For example, the control unit 1610 may send a level select input 1626 to a receiver bias driver 1628 to control the bias of the ultrasonic sensor array 1601. By knowing the time that the reflected ultrasonic energy is expected to arrive at the ultrasonic sensor array 1601, the control unit 1610 may read out the sensor signals that are associated with the ultrasonic energy that has been reflected from the platen 32 where the finger 34 (or other object, such as a stylus) resides. The control unit 1610 may control the readout of multifunctional pixels 1, 2 that make up the ultrasonic sensor array 1601 via gate drivers 1627. Once the sensor signals are read out, a data processor 1630 may be used to form a digitized data set corresponding to the sensor signals, and this data set may be provided as digital output 1640. A digitizer 1629 such as an analog-to-digital converter may be provided to convert the pixel outputs, which may be analog, into digital form. The data processor 1630 may be a digital signal processor, or other similar processor.

If an object (such as a finger 34) resides on the platen 32, the ultrasonic pulse or wave that reaches the object continues from the platen 32 to the object, where the energy is absorbed. For example, the ridges of a fingerprint that contact a platen 32 will substantially absorb the ultrasonic energy transmitted, via the platen 32, to the finger 34. However, where there are valleys of a fingerprint, which do not contact the platen 32, the ultrasonic energy will be substantially reflected back through the platen 32, and detected by the ultrasonic sensor array 1601. Other electronics may read out the individual row and column signals from the ultrasonic sensor array 1601 and the data processor 1630 may be used to create data derived from the signals. That data may be used to create an image of the object (for example, an image of the fingerprint).

Figure 7:
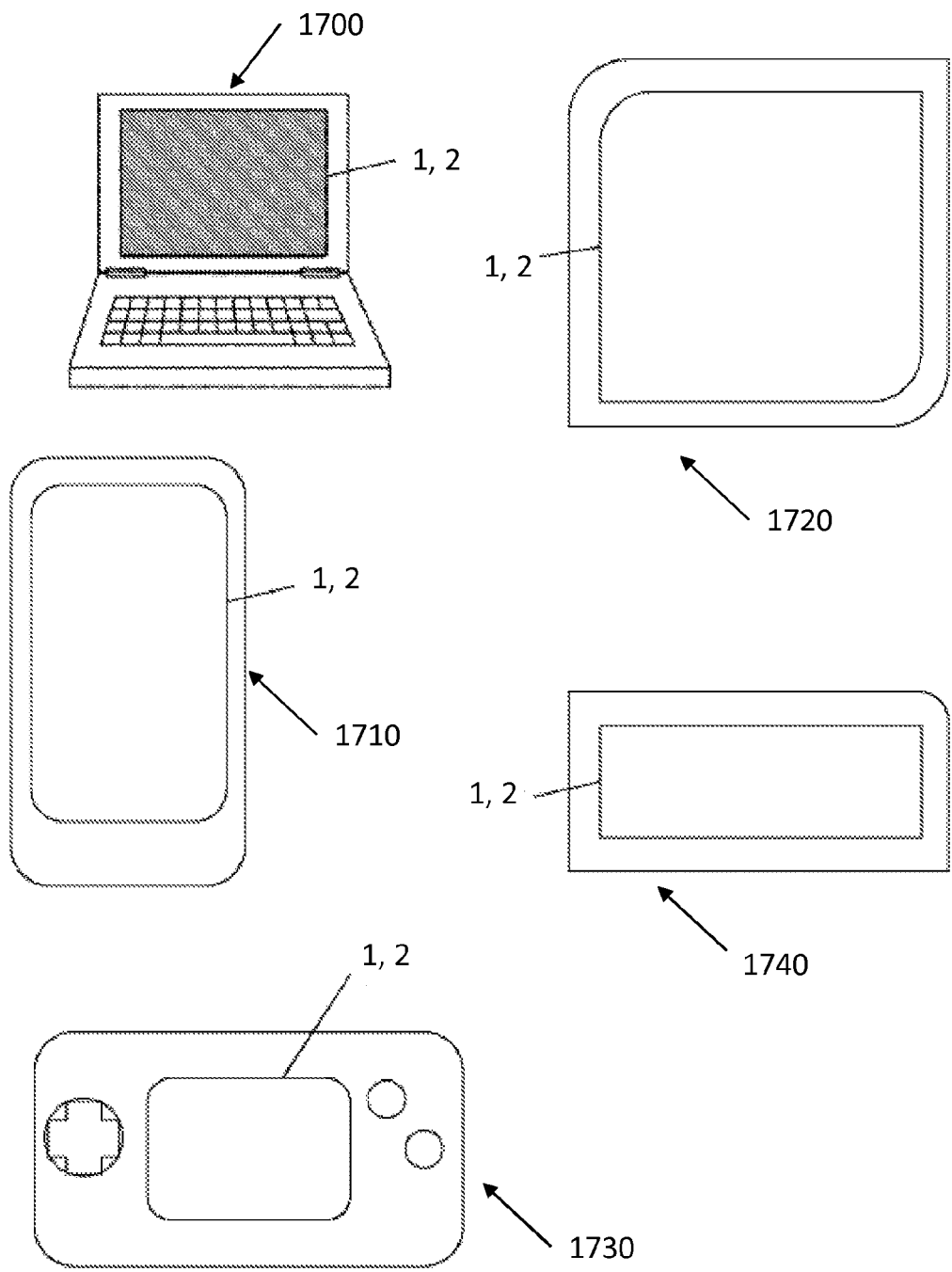
FIG. 7 depicts devices that may utilize a multifunctional pixel or pixel array.

FIG. 7 depicts devices that may utilize a multifunctional pixel or pixel display array. Display devices having an array of multifunctional pixels 1, 2 may include a laptop computer 1700, a cellphone 1710, a tablet computer 1720 (e.g. an iPad®), a game console 1730, and a medical device 1740.

Figure 8:
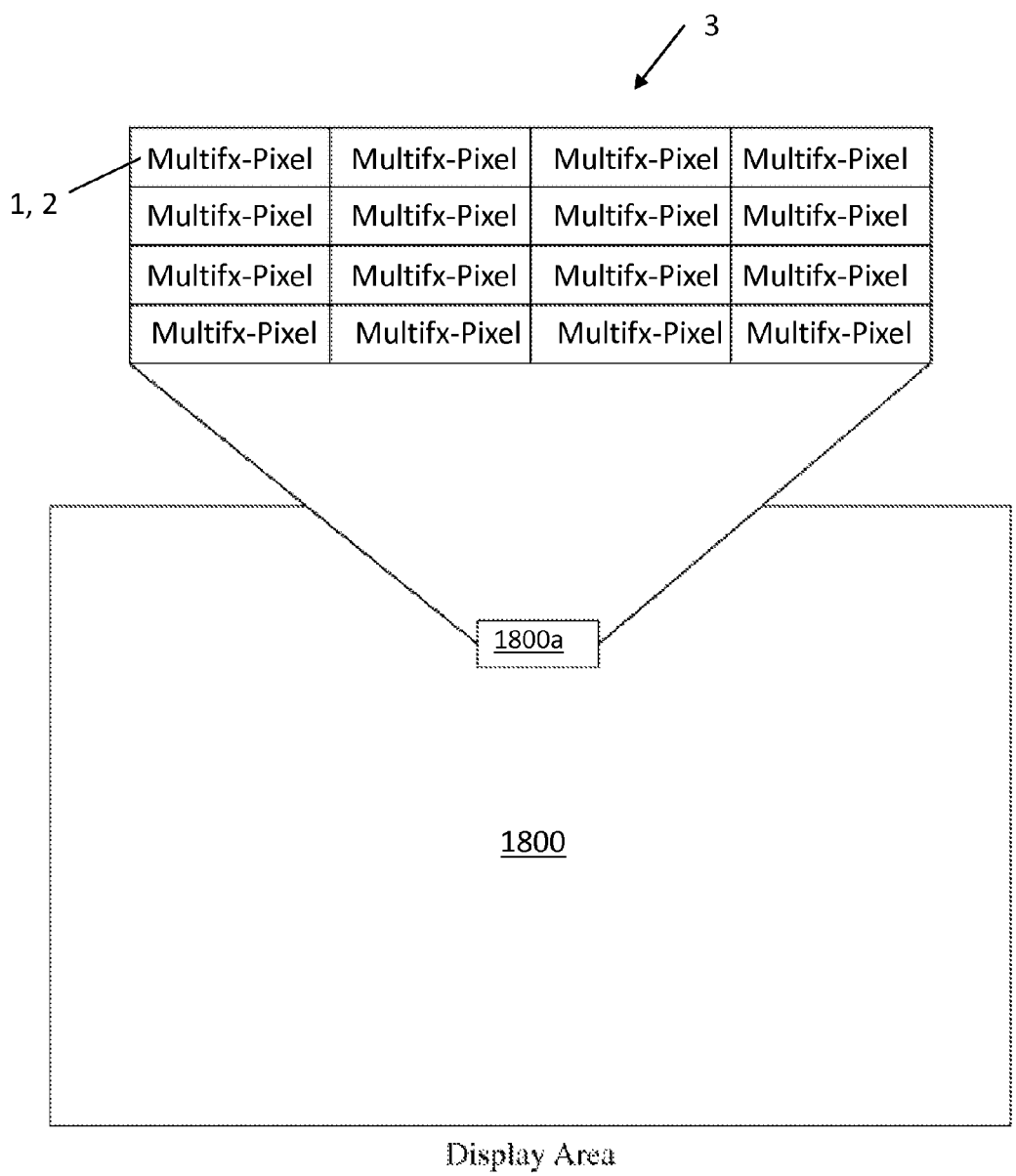
FIG. 8 depicts a visual display, including an array of multifunctional pixels, a portion of which has been enlarged.

FIG. 8 depicts a visual display including an array of multifunctional pixels, a portion of which has been enlarged. The enlarged part 1800a of the visual display 1800 includes a display sub-array 3 of sixteen multifunctional pixels 1, 2. In this implementation, each pixel in the display sub-array 3 is a multifunctional pixel 1, 2. In some modes of operation, one or more sensor circuits of sensors 20 need not be turned on. In this manner, the sensor resolution may be altered. For example, if multifunctional pixels 1, 2 are turned on in every other row and every other column of the display 1800, the sensor resolution will be one-fourth that of the visual resolution of the display 1800.

Figure 9:
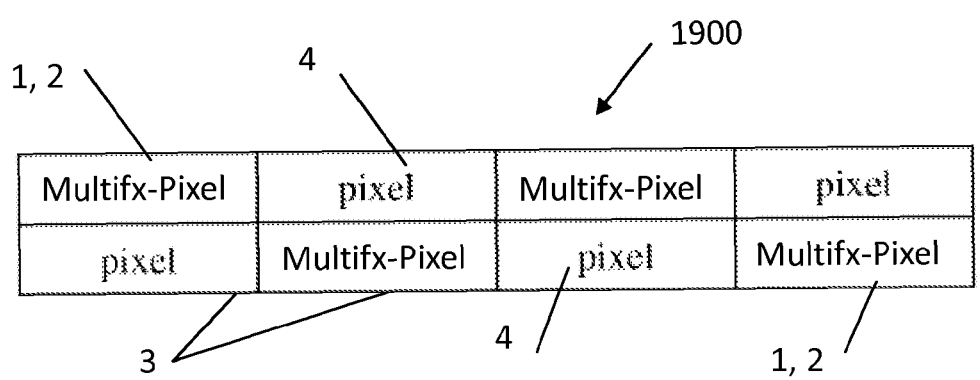
FIG. 9 depicts another visual display, including an array of multifunctional pixels alternating with display pixels.

FIG. 9 depicts another visual display including an array of multifunctional pixels alternating with display pixels. In this implementation, multifunctional pixels 1, 2 are arranged in a two-by-two display sub-array 3 having a checkerboard pattern with display pixels 4 having no sensing functions or with sensing functions disabled, and the sensor resolution is one-half that of the visual resolution of the display 1800.

Figure 10:
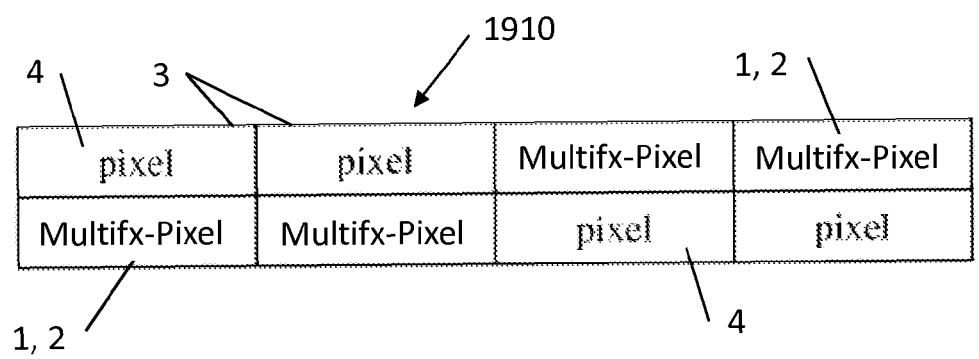
FIG. 10 depicts another visual display, including an array of multifunctional pixels and display pixels.

FIG. 10 depicts another visual display including an array of multifunctional pixels and display pixels. In this implementation, a two-by-two display sub-array 3 of two multifunctional pixels 1, 2 are placed next to two display pixels 4 having no sensing functions or with sensing functions disabled, or otherwise discounted, with a sensor resolution that is half of the display resolution.

Figure 11A:
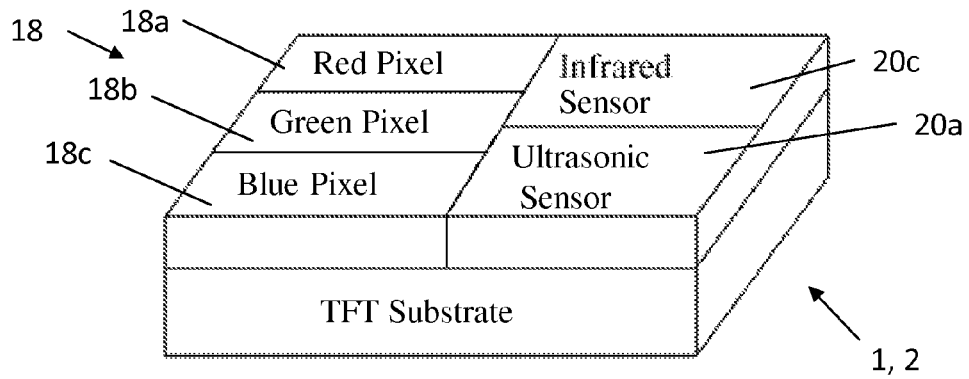
FIGS. 11A-11F illustrate various arrangements of multifunctional pixels.
Figure 11B:
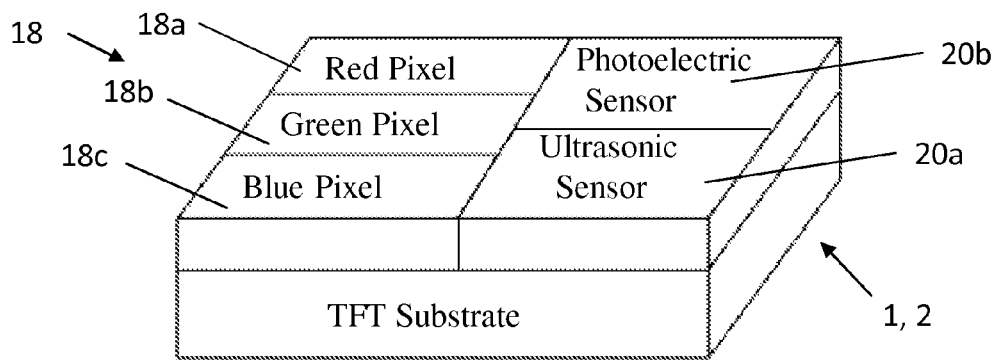
Figure 11C:
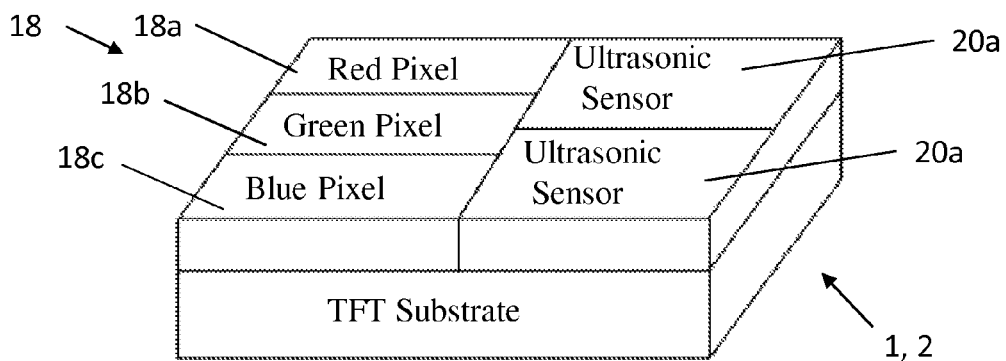
Figure 11D:
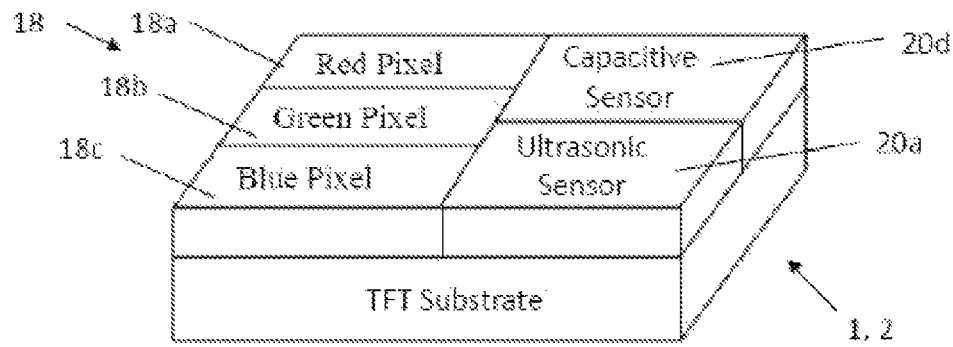
Figure 11E:
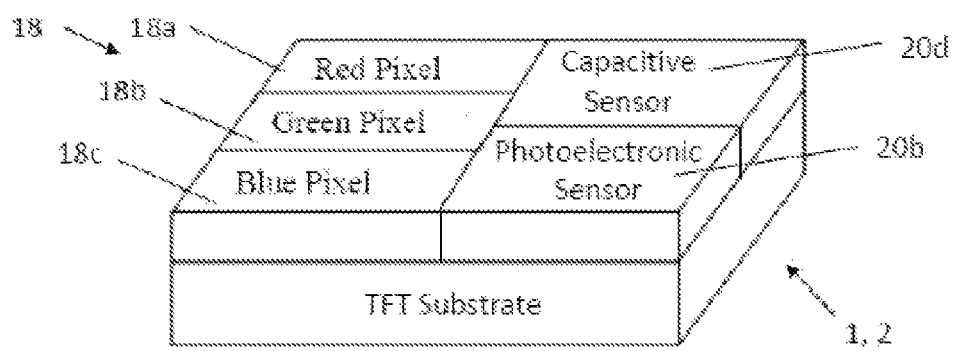
Figure 11F:
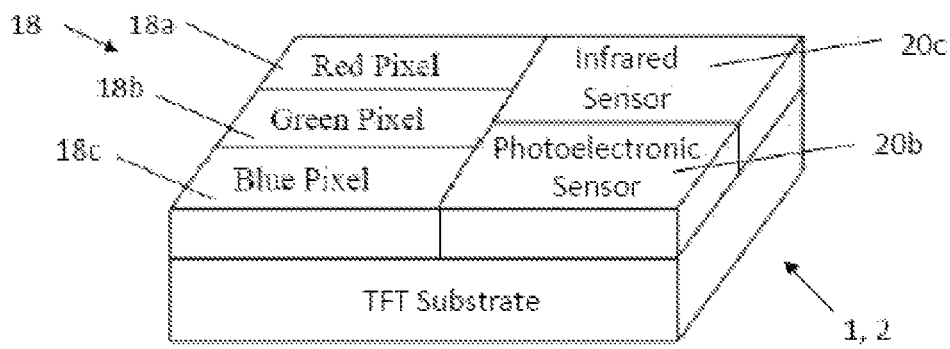

FIGS. 11A-11G illustrate various arrangements of multifunctional pixels. The multifunctional pixels may include display pixels 18 with a combination of one or more ultrasonic sensors 20a, photoelectric sensors 20b, infrared sensors 20c, or capacitive sensors 20d. Note that in FIGS. 11A-11G, not all layers of the multifunctional pixel 1, 2 are shown for clarity. In FIG. 11A, there is shown an in-cell multifunctional pixel 1, 2 having a display pixel 18 with red, green and blue display sub-pixels 18a, 18b and 18c, respectively, an ultrasonic sensor 20a, and an infrared sensor 20c. In FIG. 11B, there is shown an in-cell multifunctional pixel 1, 2 with a display pixel 18 having red, green, and blue display sub-pixels 18a-c, an ultrasonic sensor 20a, and a photoelectric sensor 20b. In FIG. 11C, there is shown an in-cell multifunctional pixel 1, 2 having red, green and blue display sub-pixels 18a-c, a first ultrasonic sensor 20a, and a second ultrasonic sensor 20a. In FIG. 11D, there is shown an in-cell multifunctional pixel 1, 2 having red, green and blue display sub-pixels 18a-c, an ultrasonic sensor 20a, and a capacitive sensor 20d. In FIG. 11E, there is shown a multifunctional pixel 1, 2 with a display pixel 18 having red, green and blue display sub-pixels 18a-18c, a photoelectric sensor 20b, and a capacitive sensor 20d. In FIG. 11F, there is shown a multifunctional pixel 1, 2 with a display pixel 18 having red, green and blue sub-pixels 18a-c, a photoelectric sensor 20b, and an infrared sensor 20c. Other implementations (not shown) may include a multifunctional pixel 1, 2 with a display pixel, a photoelectric light sensor (optical light or infrared light), and a capacitive sensor 20d. Other implementations may include other combinations of display pixels and one or more sensors.

In-cell multifunctional pixel 1, 2 may include an infrared sensor 20c, which may be able to provide signals allowing control of power to the display and other components of a display device. For example, since an infrared sensor 20c may detect infrared energy and heat, the heat from a person's finger, hand, head, or ear positioned on or near the display may be detected by infrared sensors 20c embedded in the display and interpreted to provide instructions to turn on or turn off another component in the display device. For example, an ultrasonic sensor circuit of an ultrasonic sensor 20a or a photoelectric sensor circuit of a photoelectric sensor 20b may be turned on in response to detection of heat from the person's hand, finger, head, or ear that is approaching the display. In this manner, an ultrasonic transmitter 12 associated with the ultrasonic sensor 20a may be kept off until needed. In some implementations, multifunctional pixel 1, 2 may include a capacitive sensor 20d, which may be able to detect the presence of a finger or other object near or on the multifunctional pixel 1, 2. In some embodiments, signals detected by the capacitive sensor 20d may be used as a basis for turning on an ultrasonic transmitter 12 and ultrasonic sensors 20a or other components in the display device.

Alternatively, signals from the capacitive sensor 20d may be used to provide touchscreen input for a display device. In some implementations, the infrared detection capability of the piezoelectric material may be used to detect an initial touch event from a touching object such as a finger or stylus on the surface of the display, followed by an adaptive scan of various sensors in the vicinity of the touch to rapidly determine the detailed position of the touching object.

A similar mechanism may be used with regard to a microprocessor that is programmed to provide a "welcome message" or other prompt to a user via the visual display in order to indicate that the mobile device is ready to accept the user's instructions. The microprocessor may be kept in a less active state, and brought to a more active state when sensors of the display indicate that the user desires to use the display. For example, the microprocessor may be kept in a less active state to conserve power, but when needed, the microprocessor may be brought to a more active state in order to provide the prompt. In this manner, the sensor array may detect an event that may be used to generate a response delivered via the visual display.

Figure 12A:
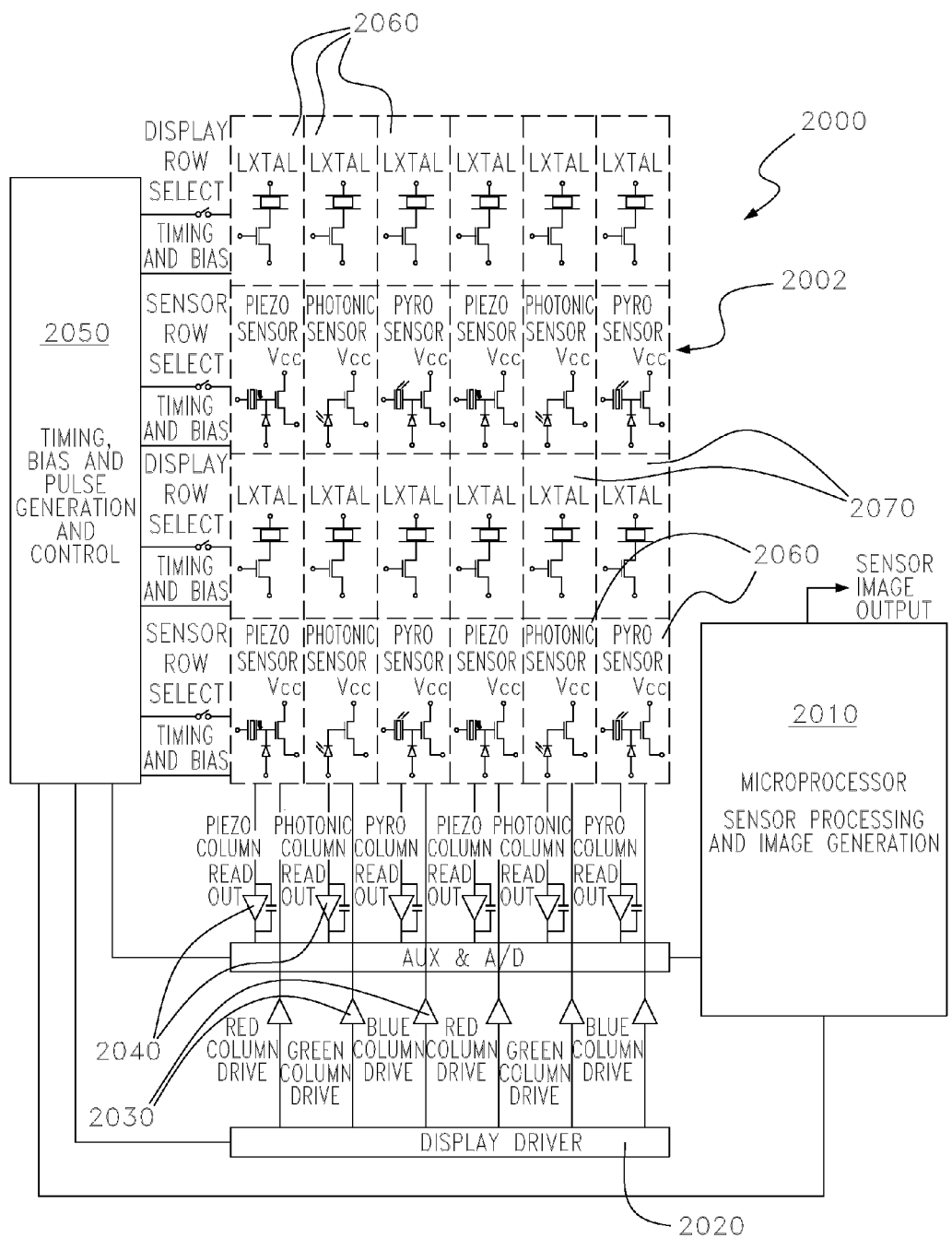
FIGS. 12-13 are flow diagrams illustrating methods of operating a multifunctional pixel.
Figure 12B:
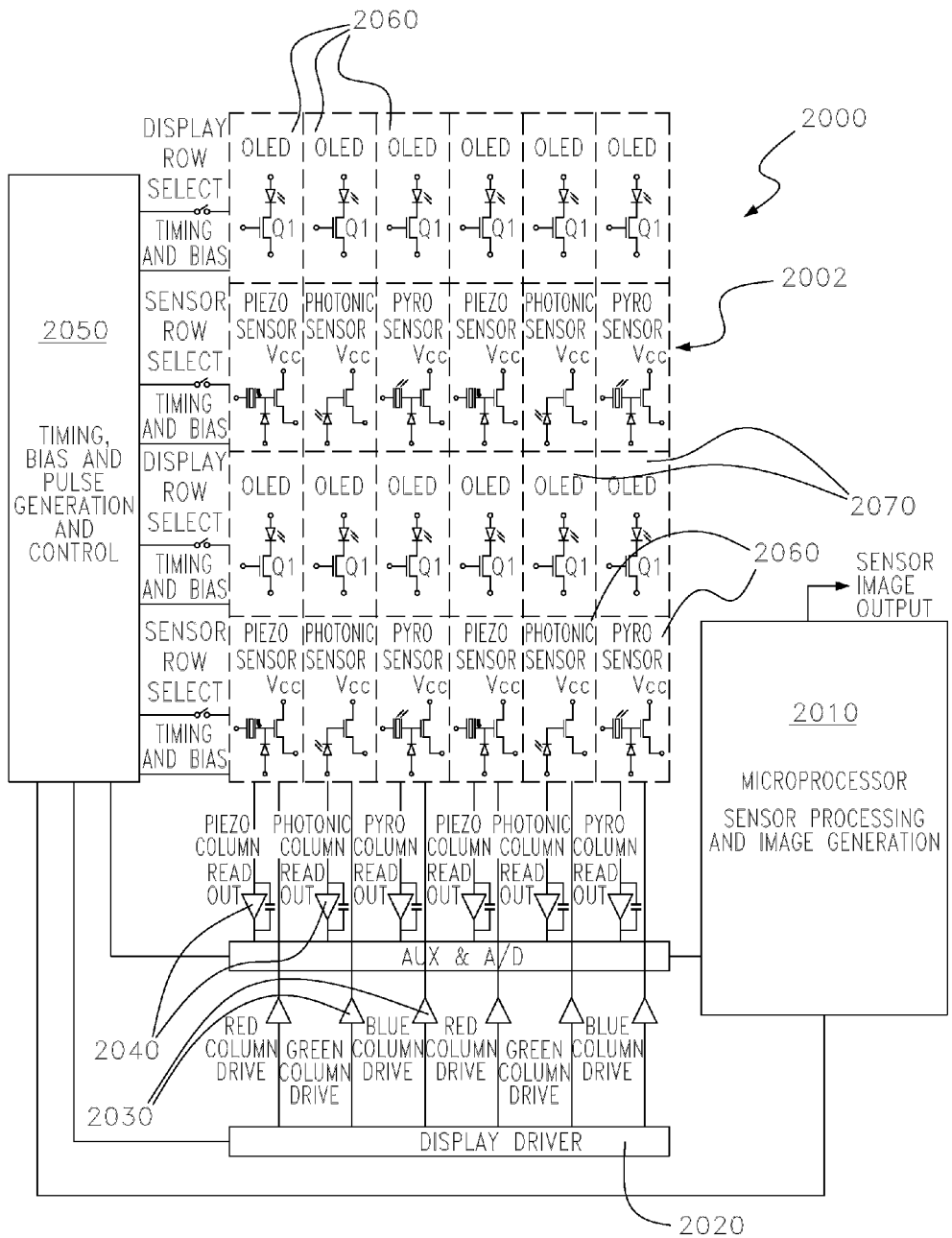
Figure 12:
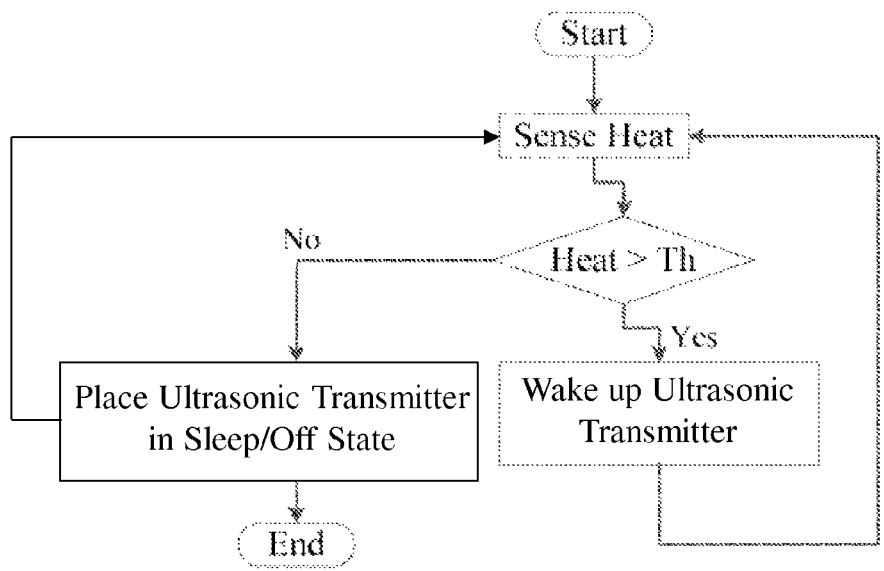

FIG. 12 is a flow diagram illustrating one implementation of a method of operating a multifunctional pixel. An infrared sensor 20c of the in-cell multifunctional pixel 1, 2 may detect heat and send a signal that is proportional to the amount of heat sensed by the sensor. The signal may be compared to a threshold, and if the threshold is exceeded, then an ultrasonic transmitter 12 may be activated. If the threshold is not exceeded, the ultrasonic transmitter 12 may remain active or be placed in an inactive state. In a similar manner, a capacitive sensor 20d of a multifunctional pixel 1, 2 may detect the proximity of a finger, stylus or other object and cause the ultrasonic transmitter 12 to be activated or remain activated.

Figure 13:
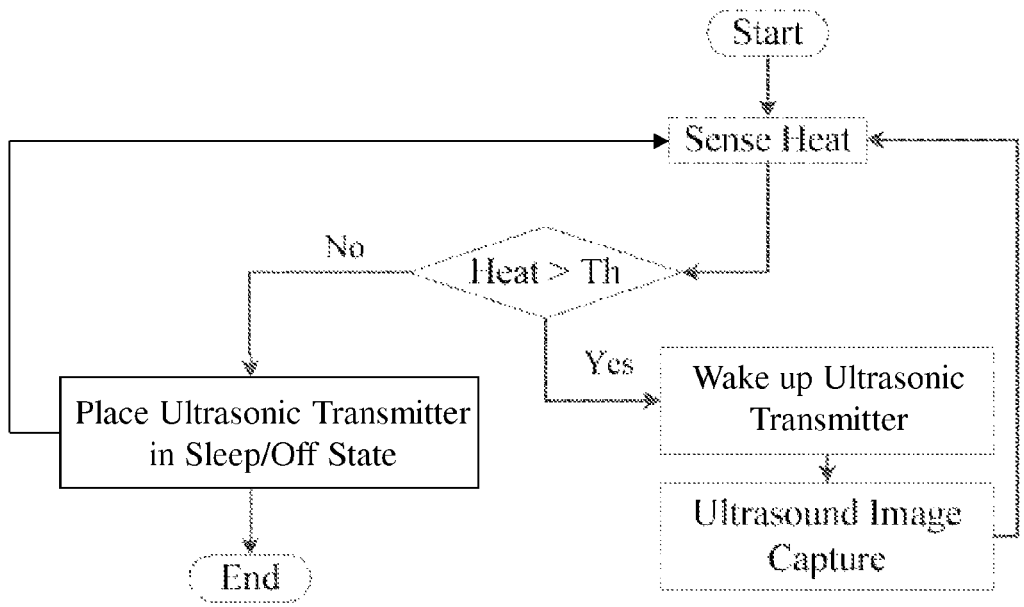

FIG. 13 is flow diagram illustrating another implementation of a method of operating a multifunctional pixel. An infrared sensor 20c of the in-cell multifunctional pixel 1, 2 may detect heat and send a signal that is proportional to the amount of heat sensed by the sensor. The signal may be compared to a threshold, and if the threshold is exceeded, an ultrasonic transmitter 12 may be activated. With the ultrasonic transmitter 12 activated, an ultrasonic image may be captured by the ultrasonic sensor 20a of the multifunctional pixel 1, 2. If the threshold is not exceeded, the ultrasonic transmitter 12 may remain active or be placed in an inactive state. Similarly, a capacitive sensor 20d of a multifunctional pixel 1, 2 may detect the proximity of a finger, stylus or other object and cause the ultrasonic transmitter 12 to be activated and an ultrasound image to be captured.

Figure 14A:
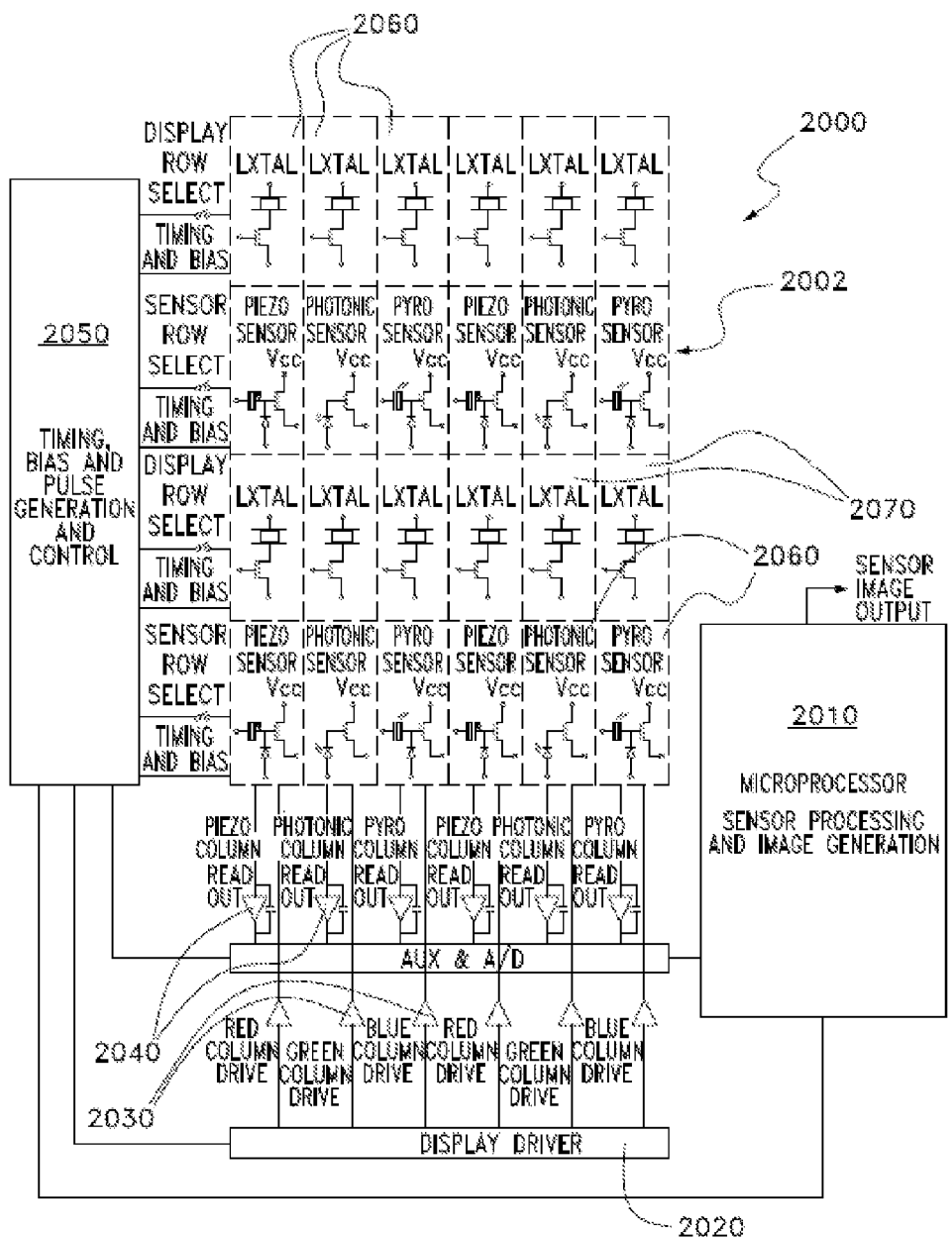
FIGS. 14A-14G depict circuitry of a multifunctional pixel system that may be used to operate a multifunctional pixel display array.
Figure 14B:
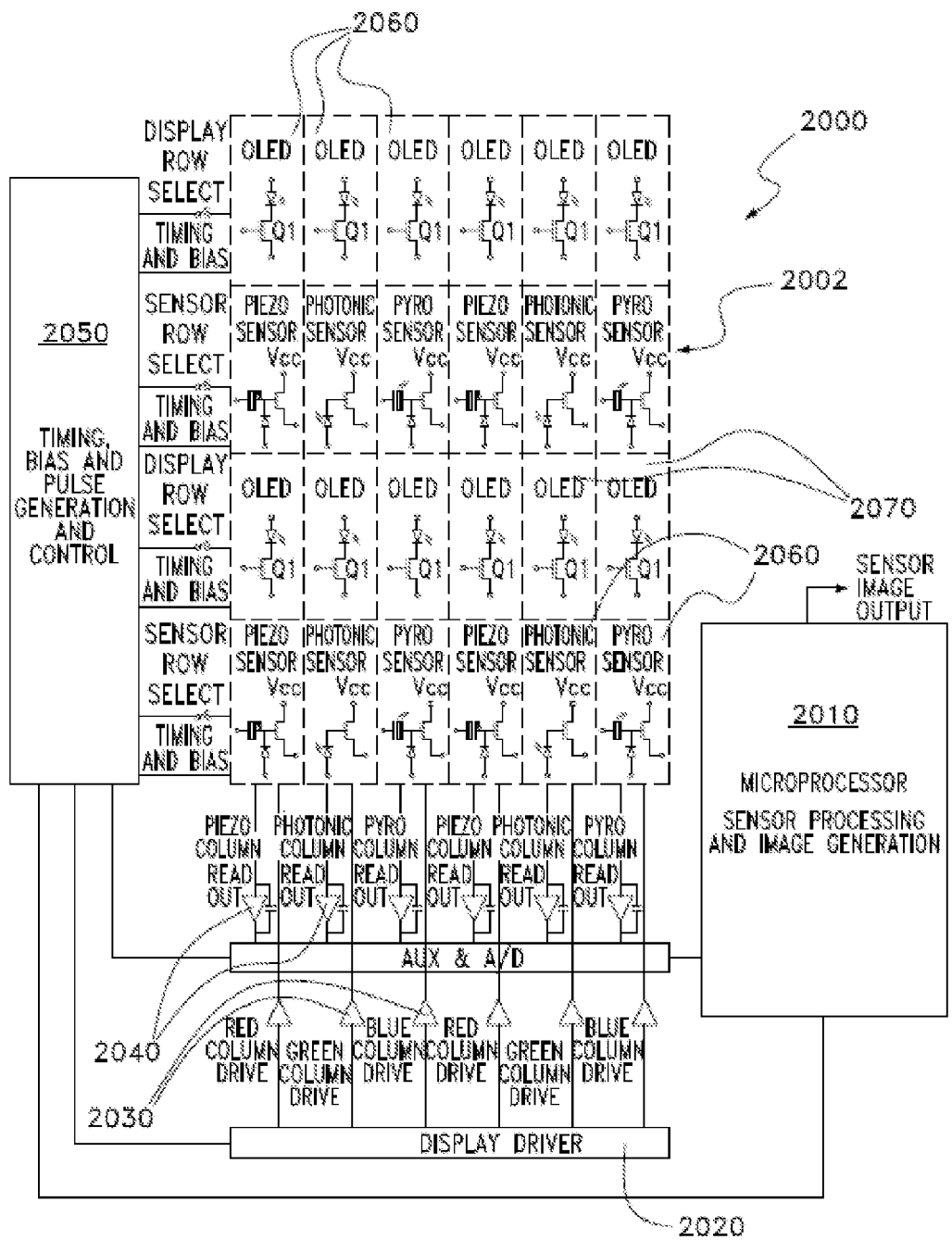

FIGS. 14A and 14B depict circuitry of a multifunctional pixel system that may be used to operate a multifunctional pixel display array. FIG. 14A depicts circuitry 2000 for a multifunctional pixel display array 2001 having LCD display components. FIG. 14B shows circuitry 2000 for a multifunctional pixel display array 2002 having OLED display components. The circuitry 2000 may include a microprocessor 2010 programmed to provide signals to a pixel display array driver 2020 having a column-driver circuit 2030. In addition, the microprocessor 2010 may be programmed to provide signals for operating a sensor array readout circuit 2040. A timing bias and pulse generation control circuit 2050 can be provided, for example, to control the timing and bias of the display circuits 2060 and/or the sensor circuits 2070. The bias and pulse generation control circuit 2050 may be configured to select rows or columns of the multifunctional pixel display array 2001, 2002. While a triad of a piezoelectric sensor, a photoelectric sensor and a pyroelectric sensor is depicted in FIGS. 14A and 14B, one or more sensor types including photoelectric sensors, optical light sensors, infrared light sensors, infrared sensors, ultrasonic sensors, acoustic or acoustic emission sensors, piezoelectric force or pressure sensors, thermal sensors, or capacitive sensors may be configured into one or more multifunctional pixels in the display array.

Figure 14C:
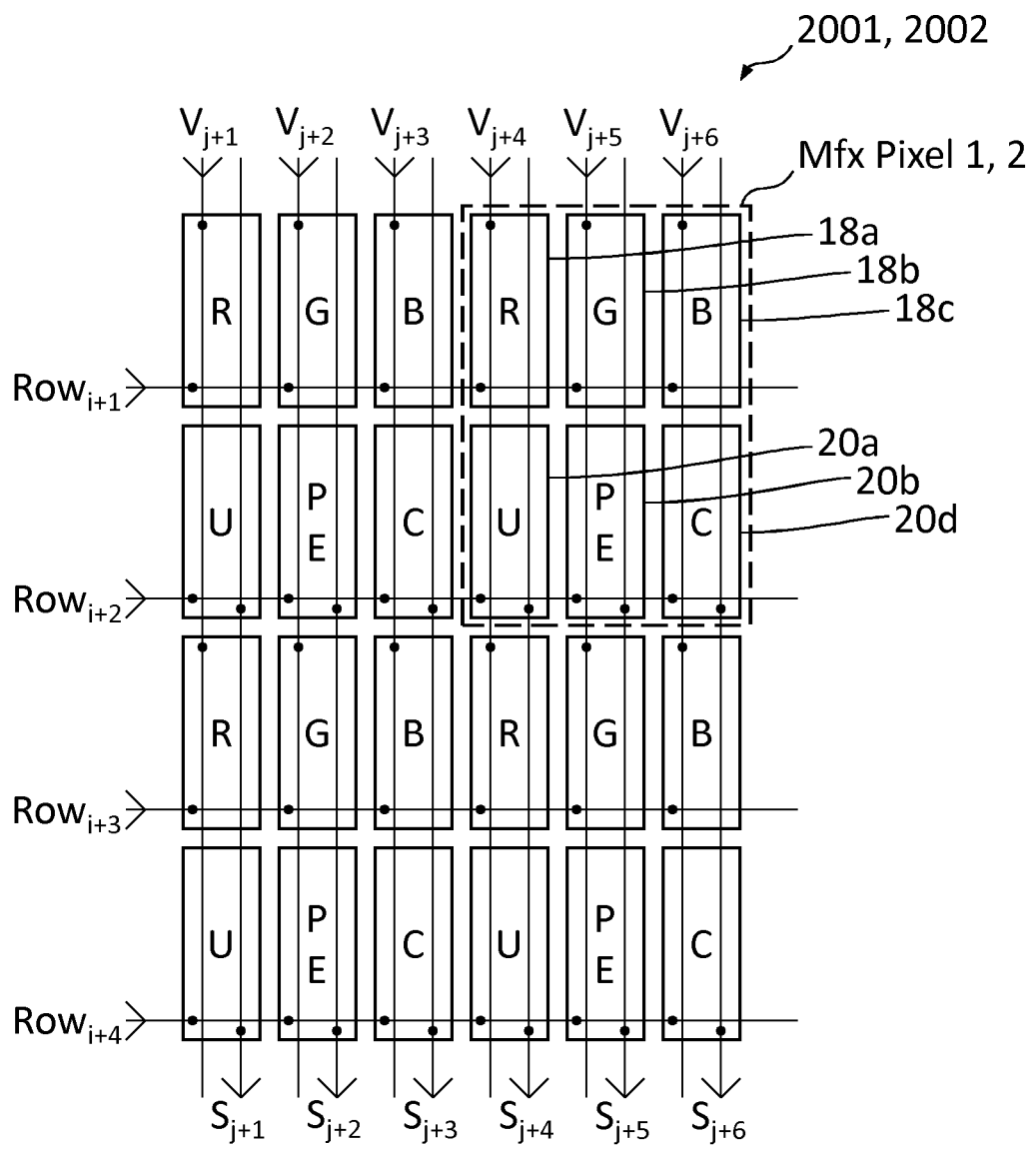
Figure 14D:
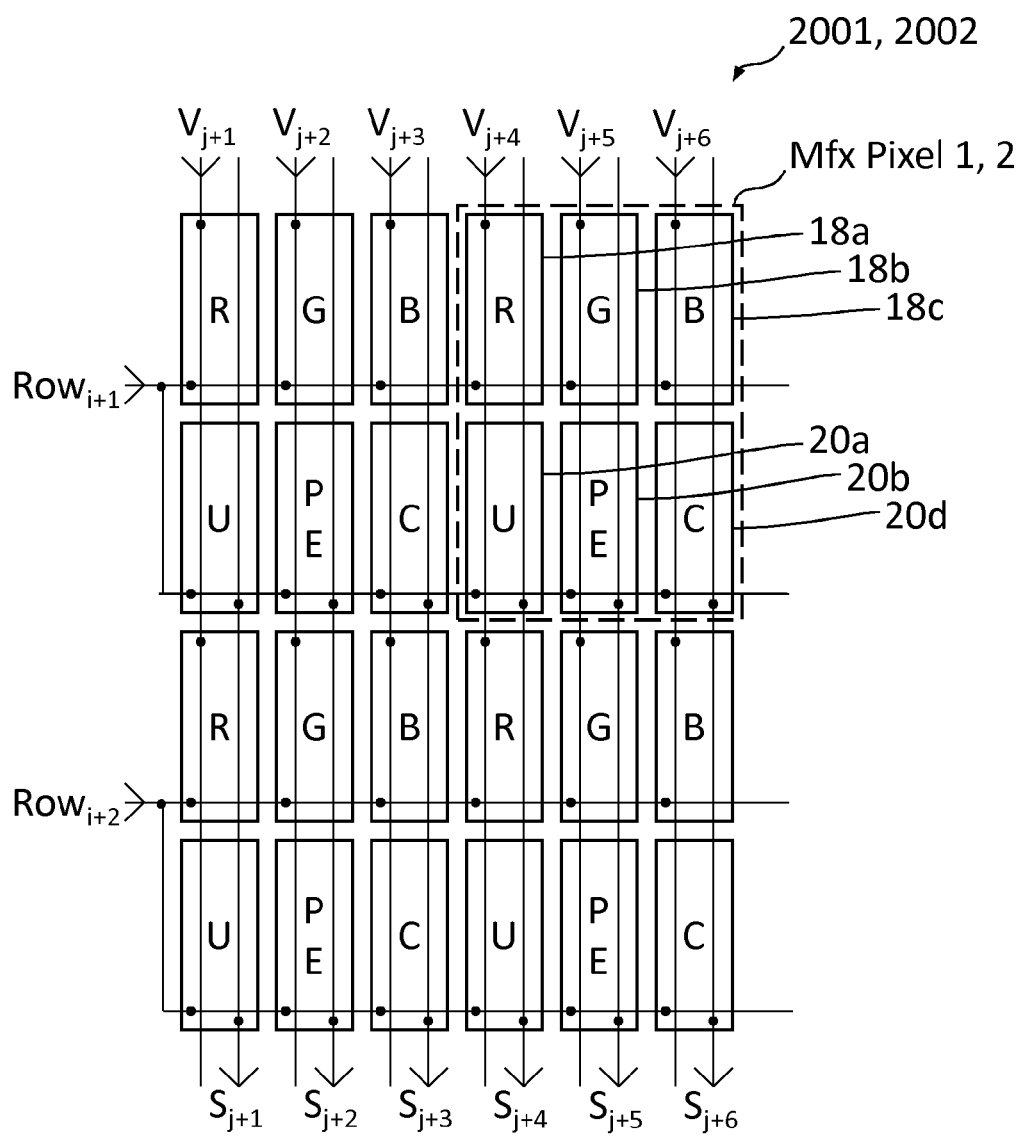

As large numbers of row select lines, column driver lines and sensor readout lines can occlude viewing of the display elements, approaches to minimizing the number of lines may be beneficial. FIG. 14C depicts independent row addressing for a display array 2001, 2002 of multifunctional pixels 1, 2 configured with an LCD or OLED display pixel having three sub-pixels 18a, 18b and 18c for red, green and blue respectively, and three sensors 20a, 20b and 20d representing an ultrasonic sensor, a photoelectric sensor, and a capacitive sensor respectively. Video or display input lines for the display sub-pixels and sensor output signal lines for the sensors are separated. This configuration allows independent frame rates for the display pixels and the sensors, and also allows different sensor resolutions by disabling, discounting, disconnecting, ignoring, not enabling, not accessing, not addressing, or otherwise disregarding certain rows or columns of sensors. In one embodiment, the frame rate, the frame size, and the resolution of the photoelectric sensors, the second sensors, or other sensors in the multifunctional pixel display array may be configured to be adjustable by determining and accessing a subset of sensor rows and columns. In a different embodiment, the number of row select lines may be reduced by addressing a row of display elements and a row of sensor elements with a common row select line, as shown in FIG. 14D. Additional lines for powering or resetting the sensors may be included in yet another embodiment.

Figure 14E:
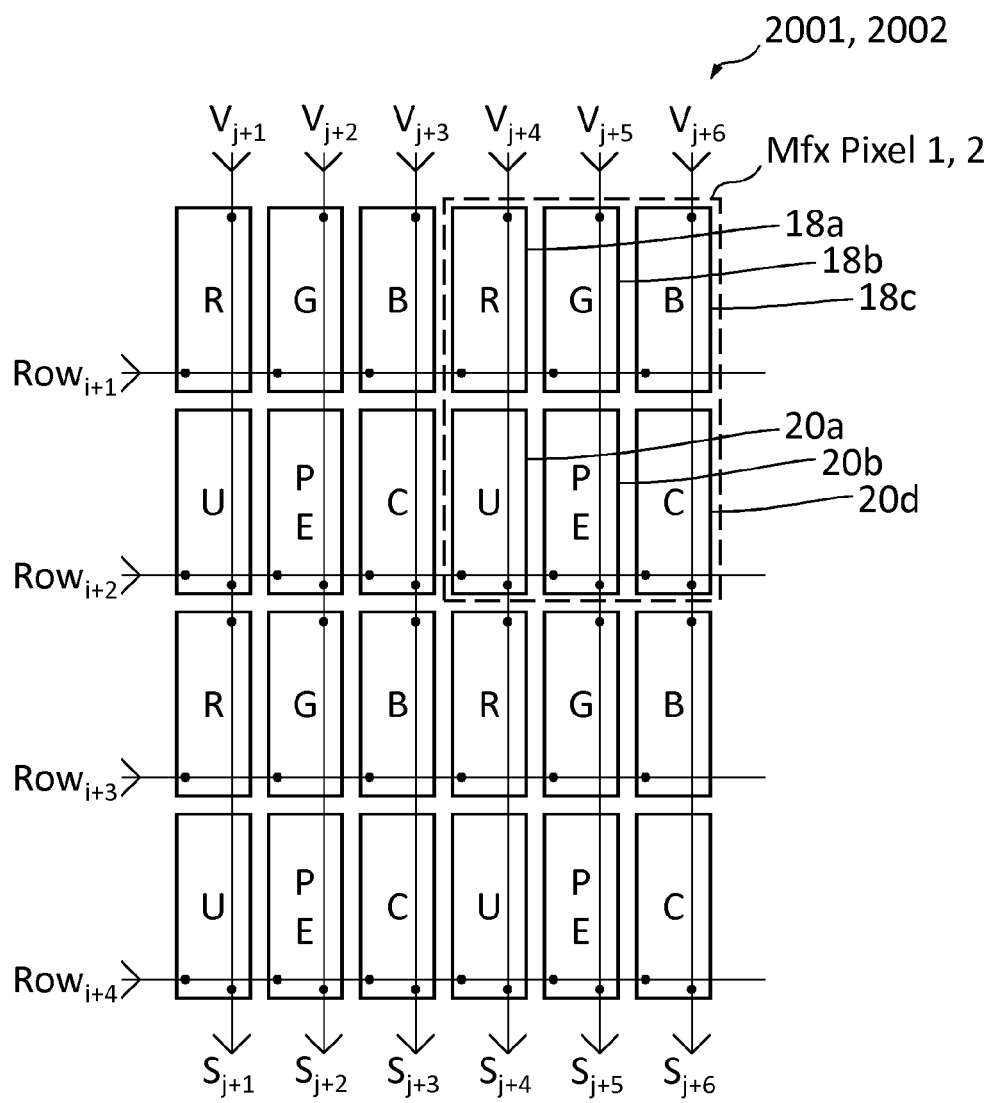
Figure 14F:
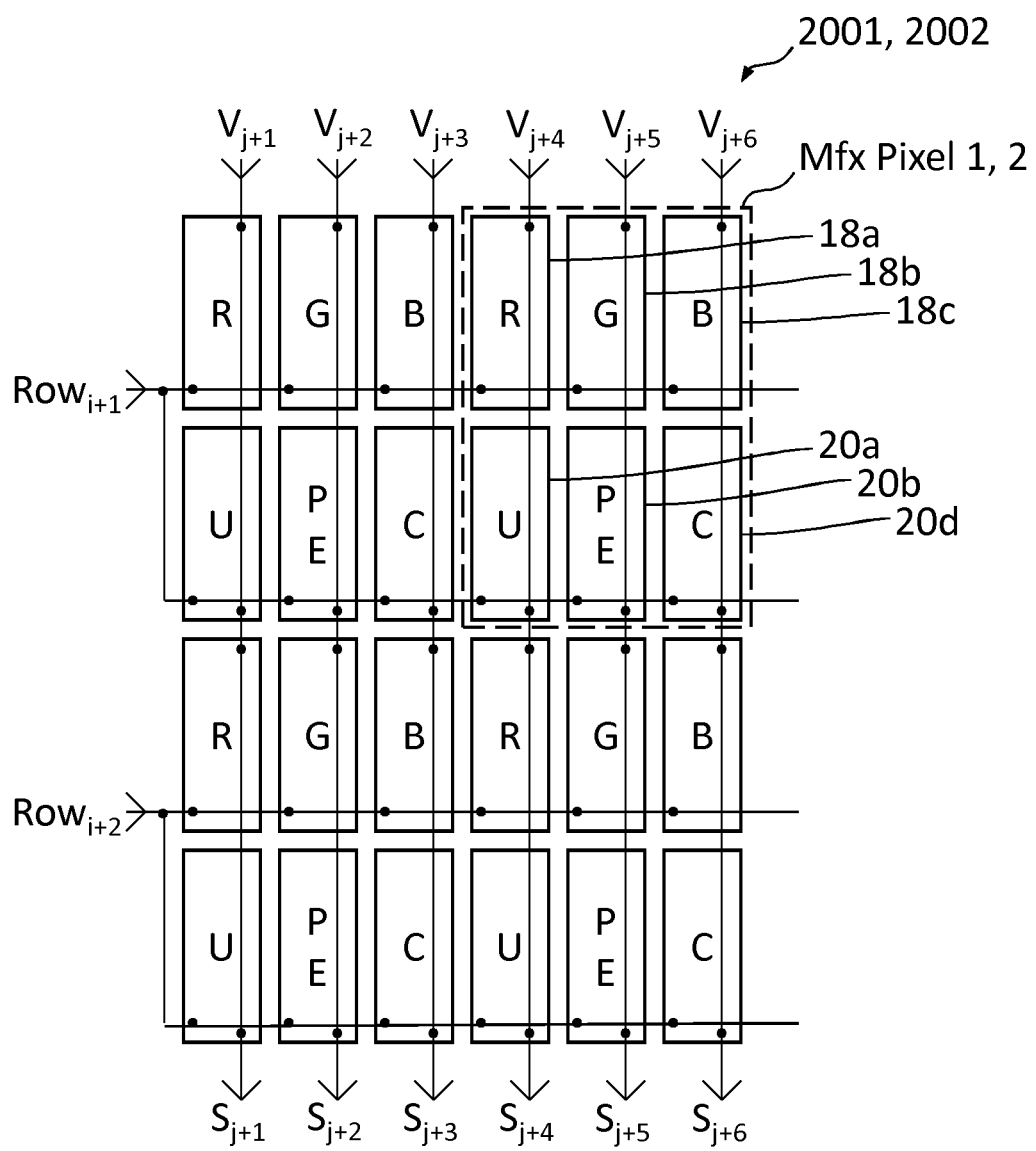
Figure 14G:
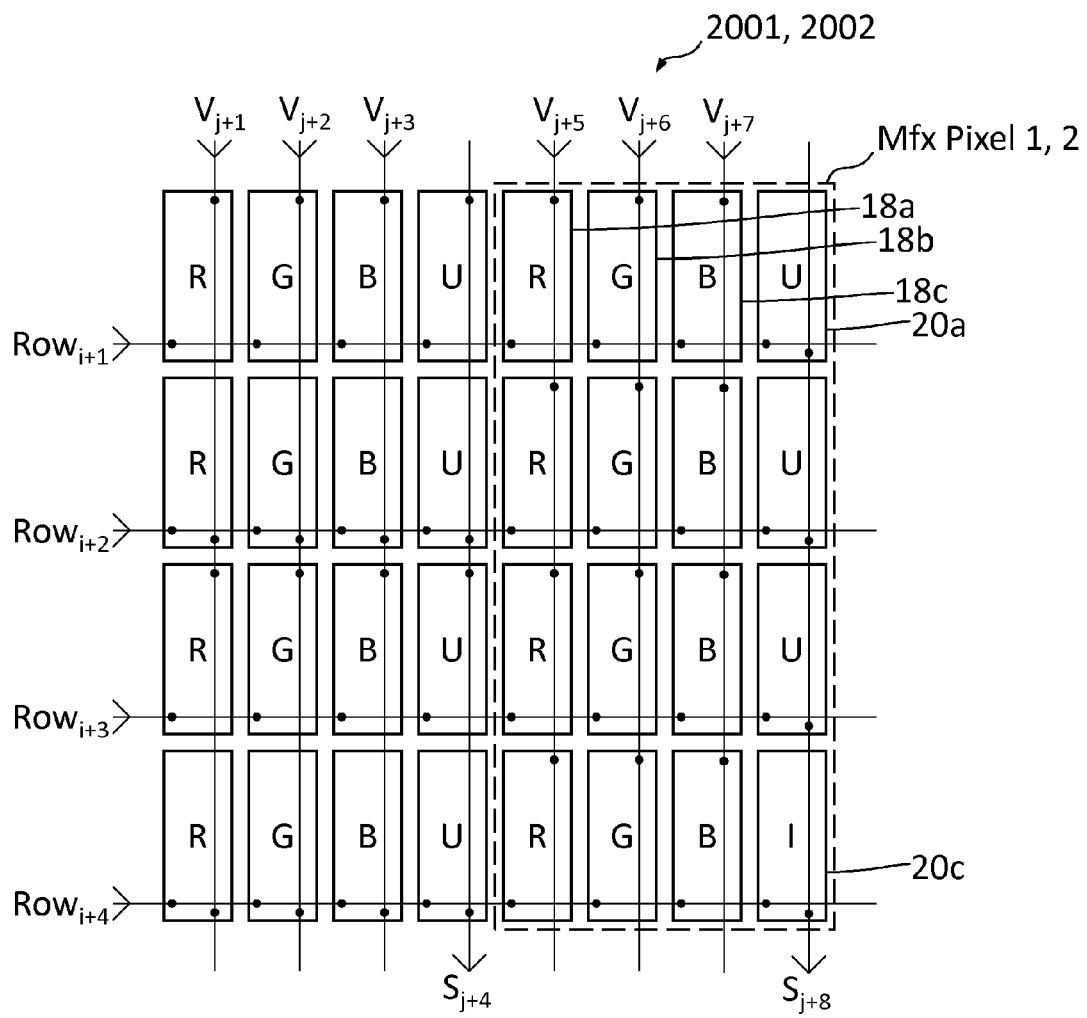

In a further embodiment, as depicted in FIG. 14E, the number of video input lines and sensor output lines may be reduced by driving the display pixels and sensing the sensor output signals with the same column line. In this embodiment, the common column line may be used for video input while rows of display pixels are selected, and used for sensor output when rows of sensors are selected. A high output impedance mode for the display column drivers may be included to allow accurate detection of the sensor output signals on the column lines when in a sense mode. Another embodiment, as depicted in FIG. 14F, may have common display/sensor row select lines and common video input/sensor output column lines. Another embodiment, as depicted in FIG. 14G, shows a multifunctional pixel 1, 2 having several sets of red, green and blue sub-pixels 18a-c, multiple ultrasonic sensors 20a, and an infrared sensor 20c. Row and column addressing is used to provide display data for the display elements and to read sensor data from the sensor elements. The ultrasonic sensors 20a may be used for moderately high resolution ultrasonic imaging, while the infrared sensor 20c may be used for sparse infrared imaging. Sparse infrared imaging may be useful, for example, for detecting gestures or detecting heat from a finger positioned close to or on the multifunctional pixel 1, 2. In some implementations, sparse infrared imaging may be used to detect the presence of an object prior to turning on an ultrasonic transmitter for ultrasonic imaging. In some implementations such as those shown in FIGS. 14C-14G, the row select lines and/or the column drive/sense lines along with other control and power lines may be formed in two or more interconnect layers to consume less areal space and avoid excessive occlusion of the display array. For example, a first row select line for a row of display sub-pixels and sensors may be positioned directly above a second row select line for a neighboring row of display sub-pixels and sensors.

Figure 14H:
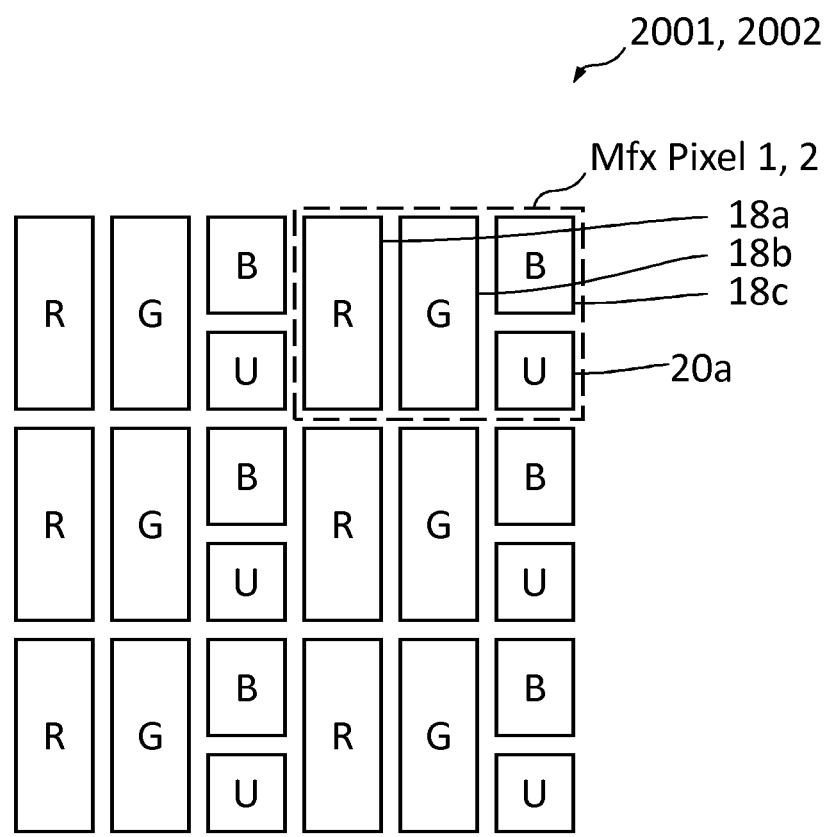
FIGS. 14H-14Z depict various arrangements of sensors and sensor types within a multifunctional pixel.
Figure 14I:
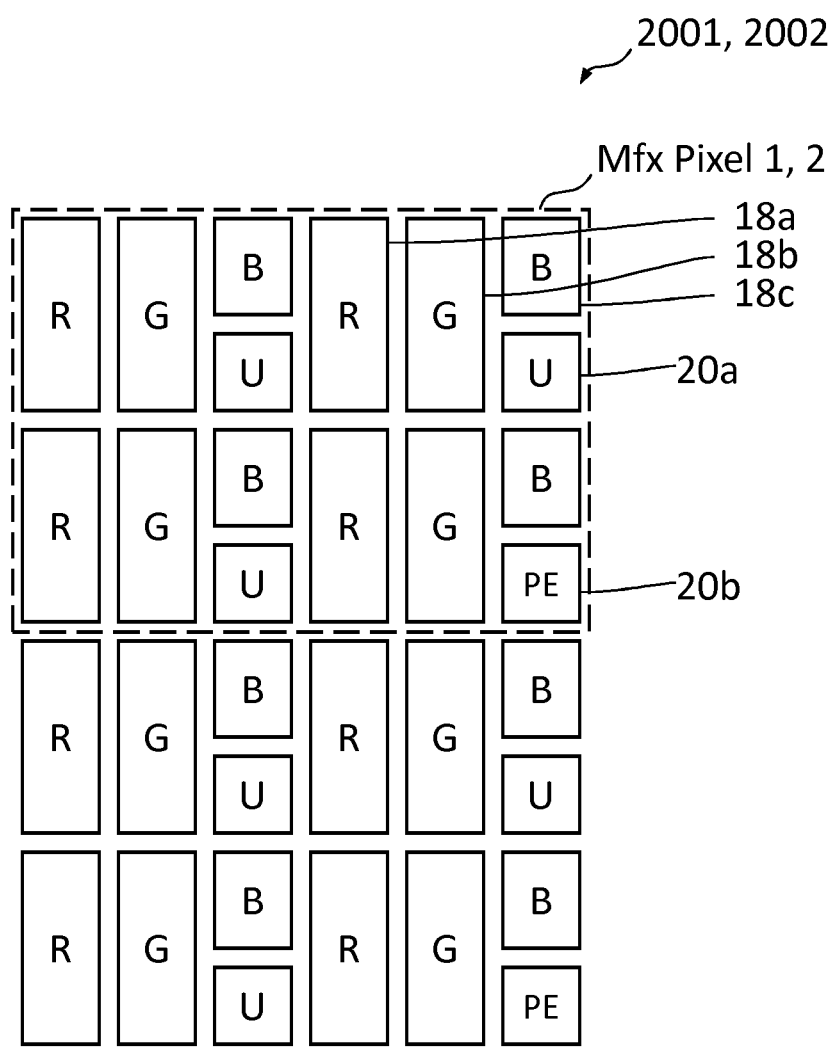
Figure 14J:
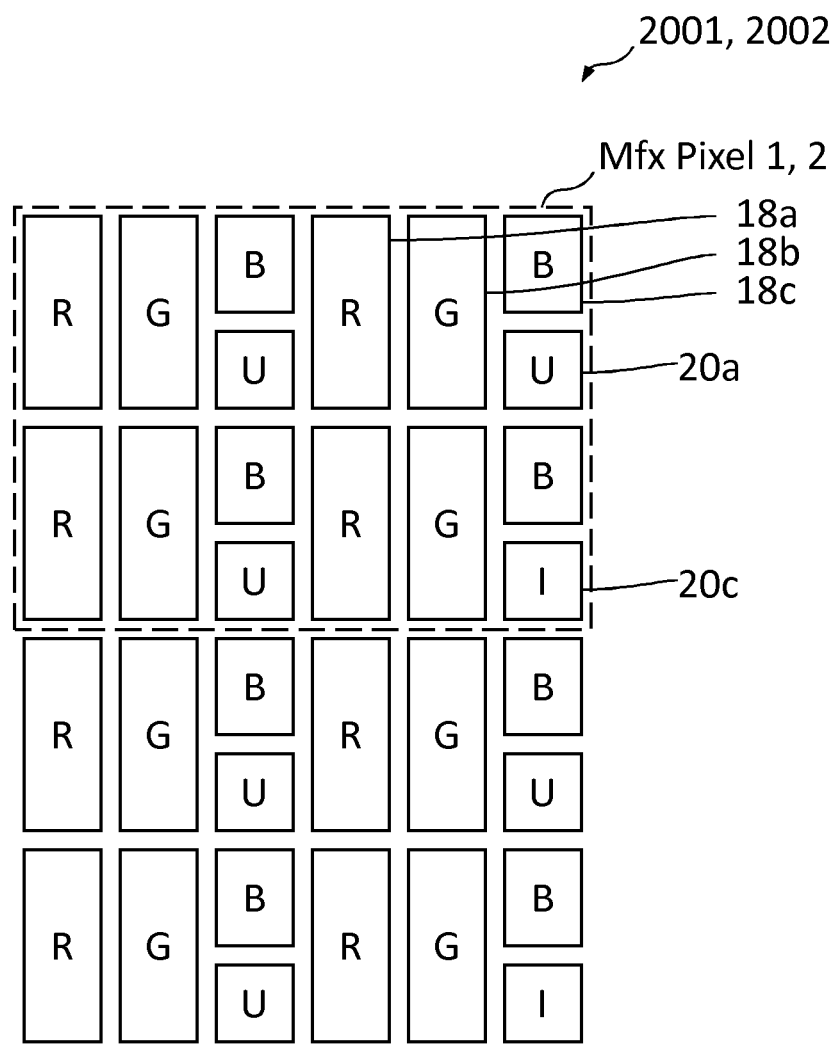
Figure 14K:
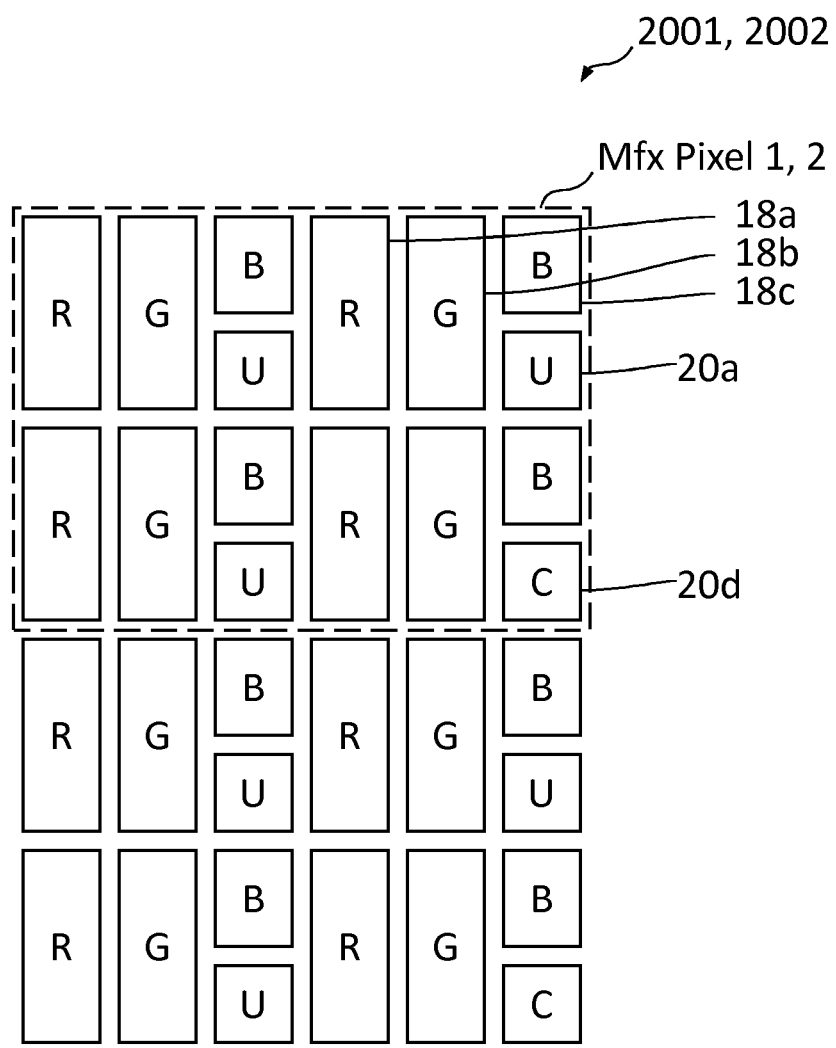
Figure 14L:
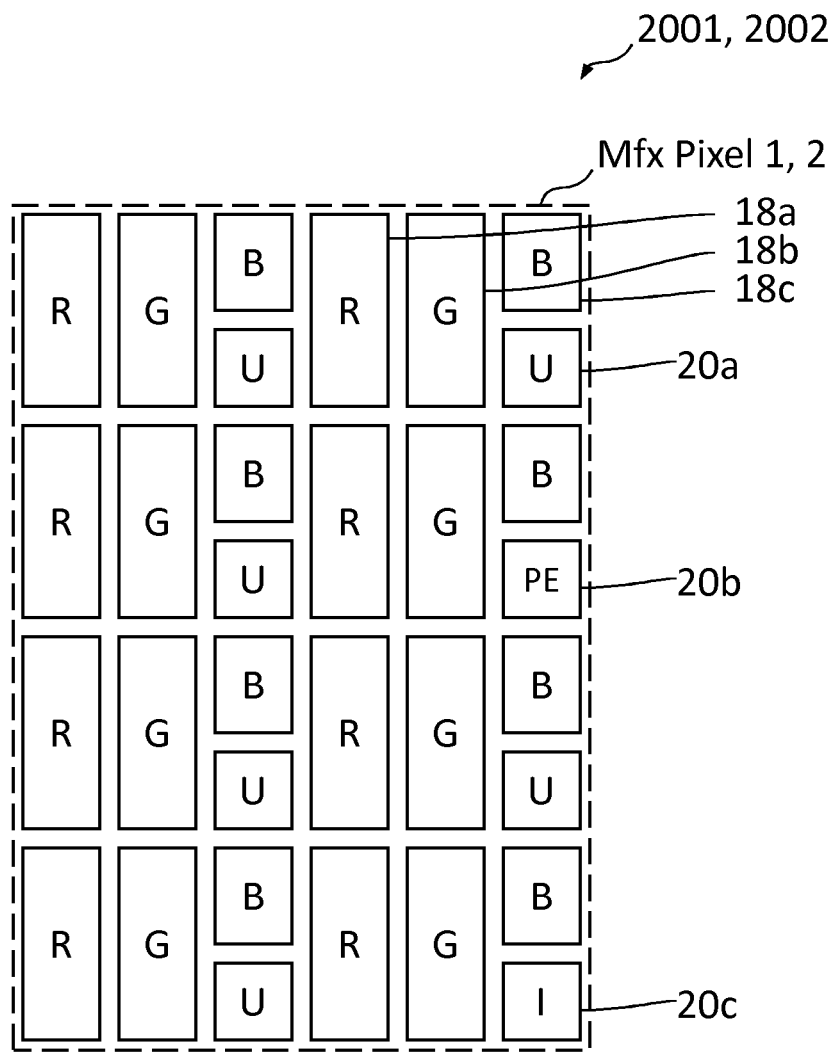
Figure 14M:
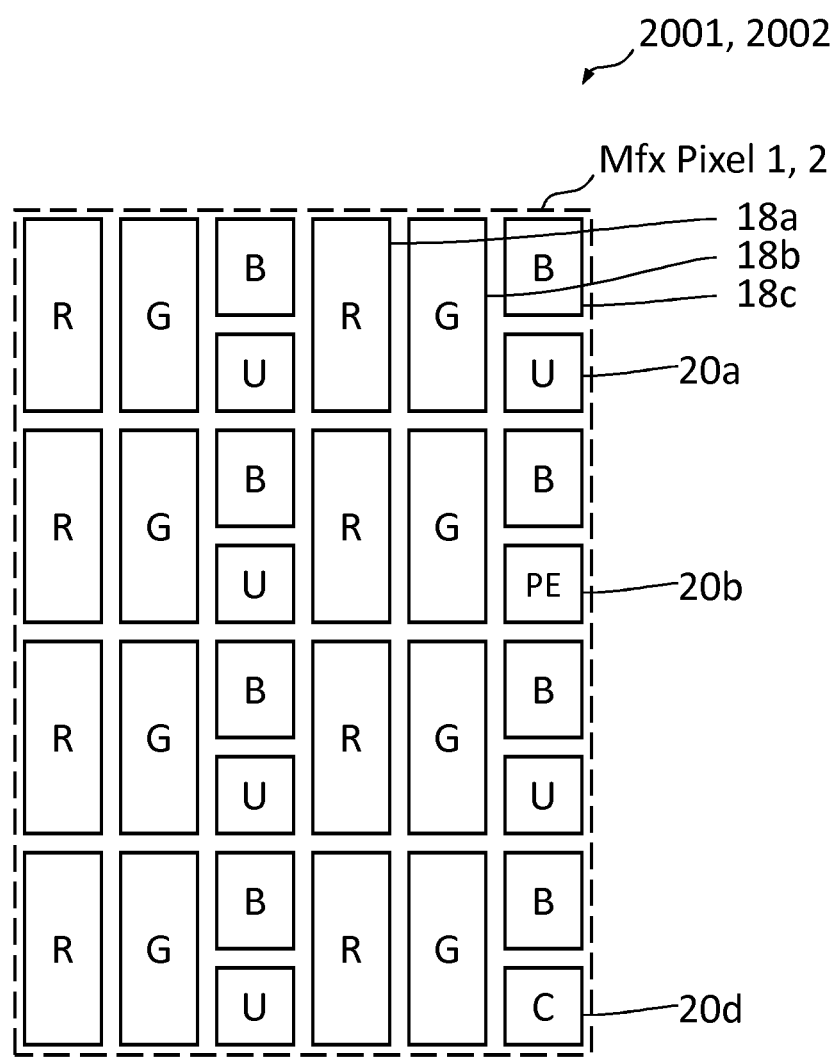
Figure 14N:
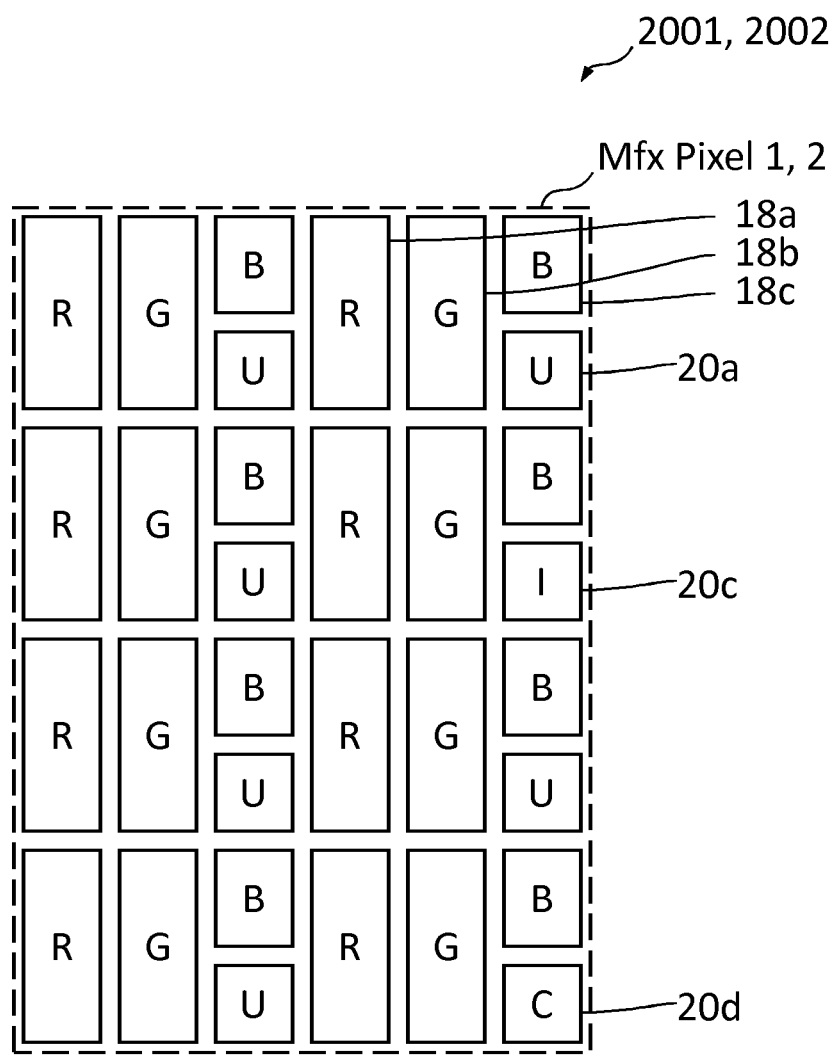
Figure 14O:
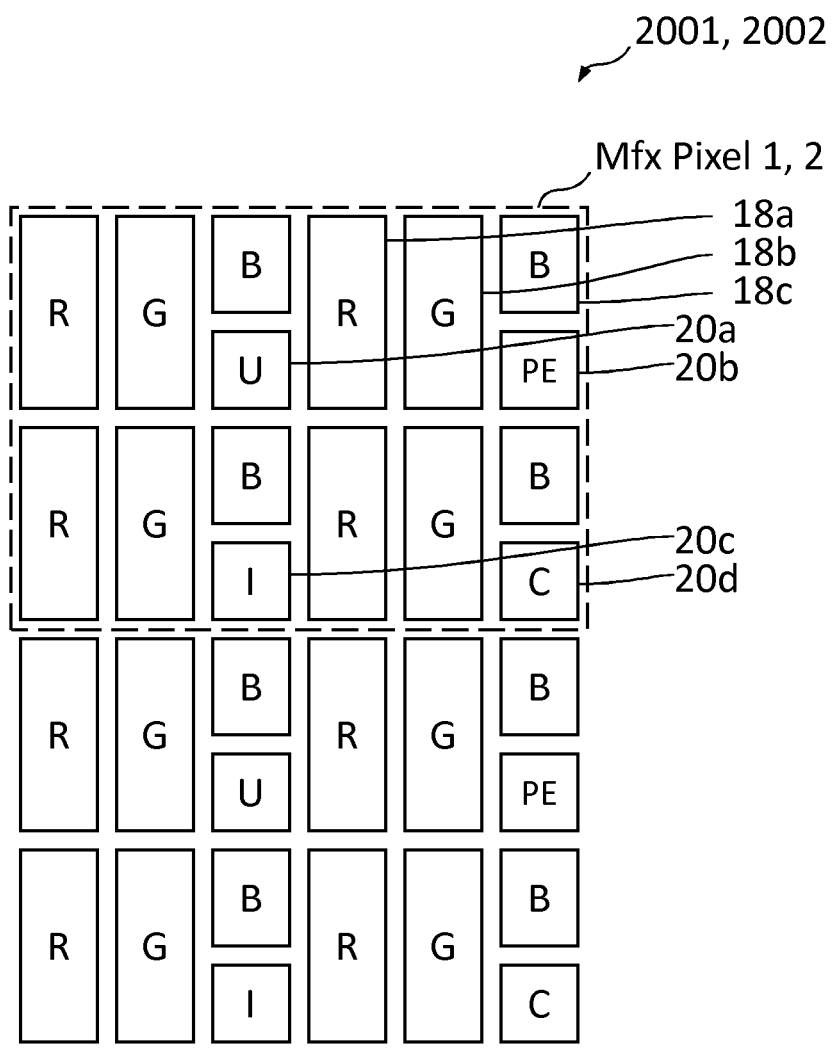
Figure 14P:
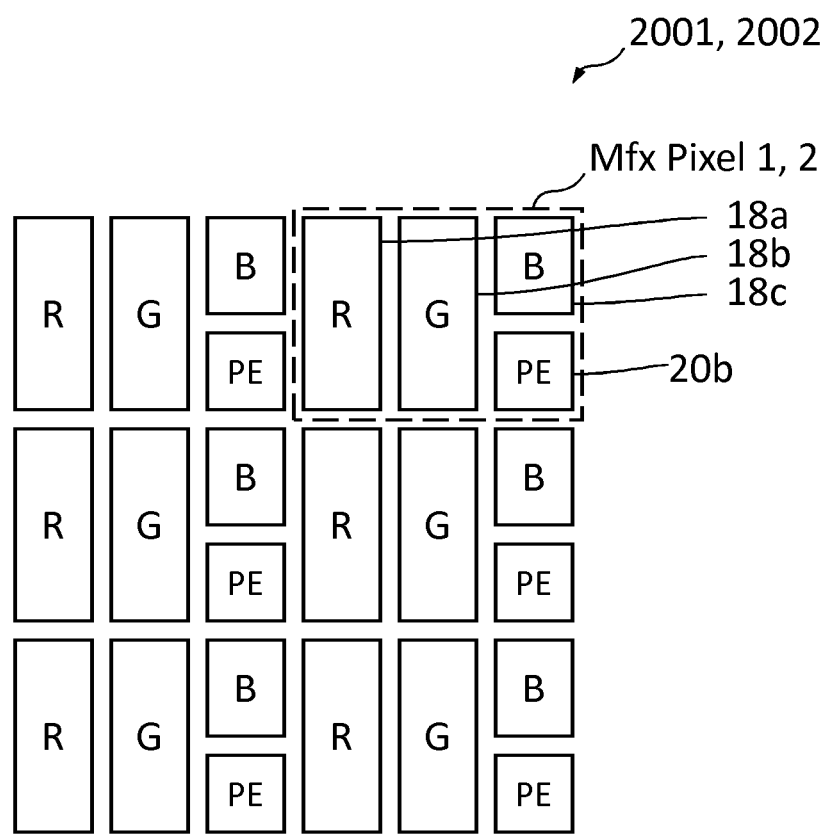
Figure 14Q:
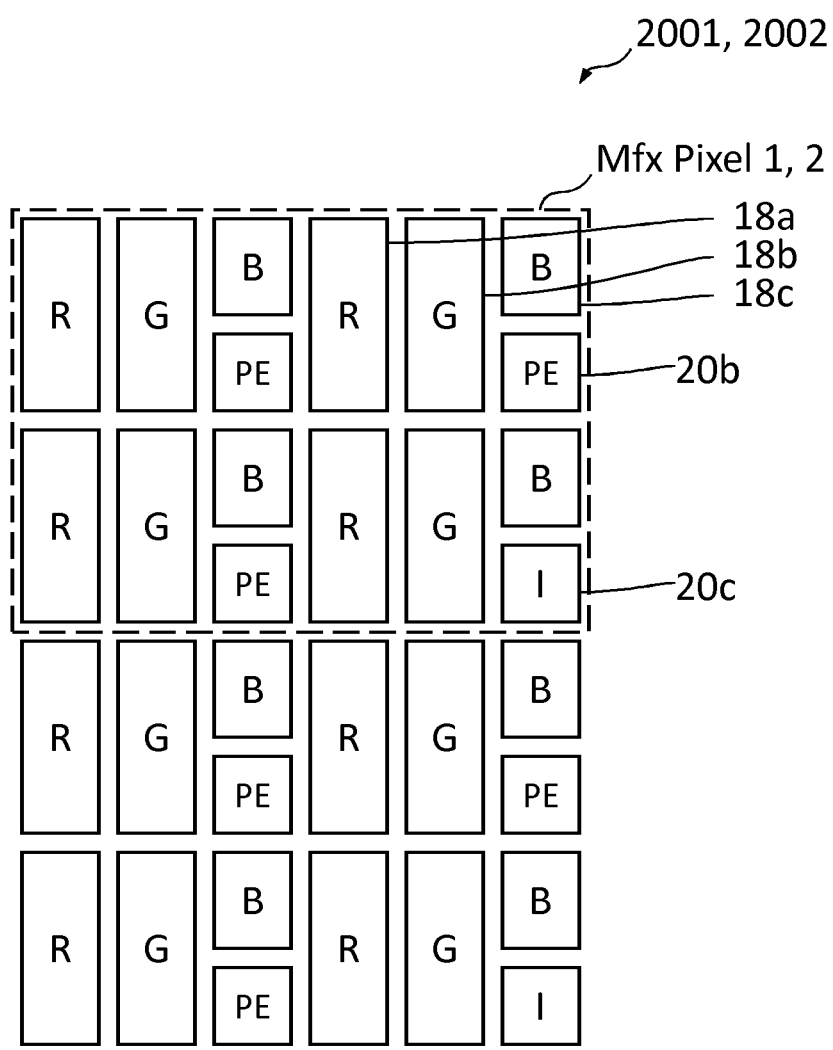
Figure 14R:
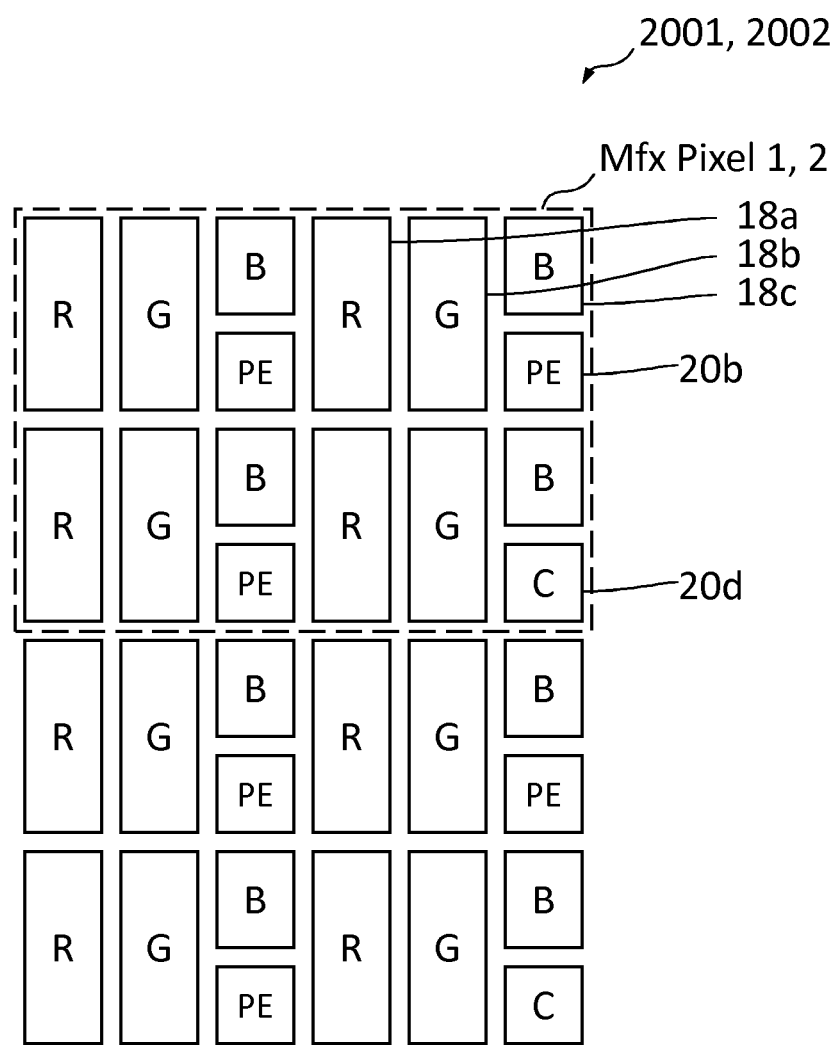
Figure 14S:
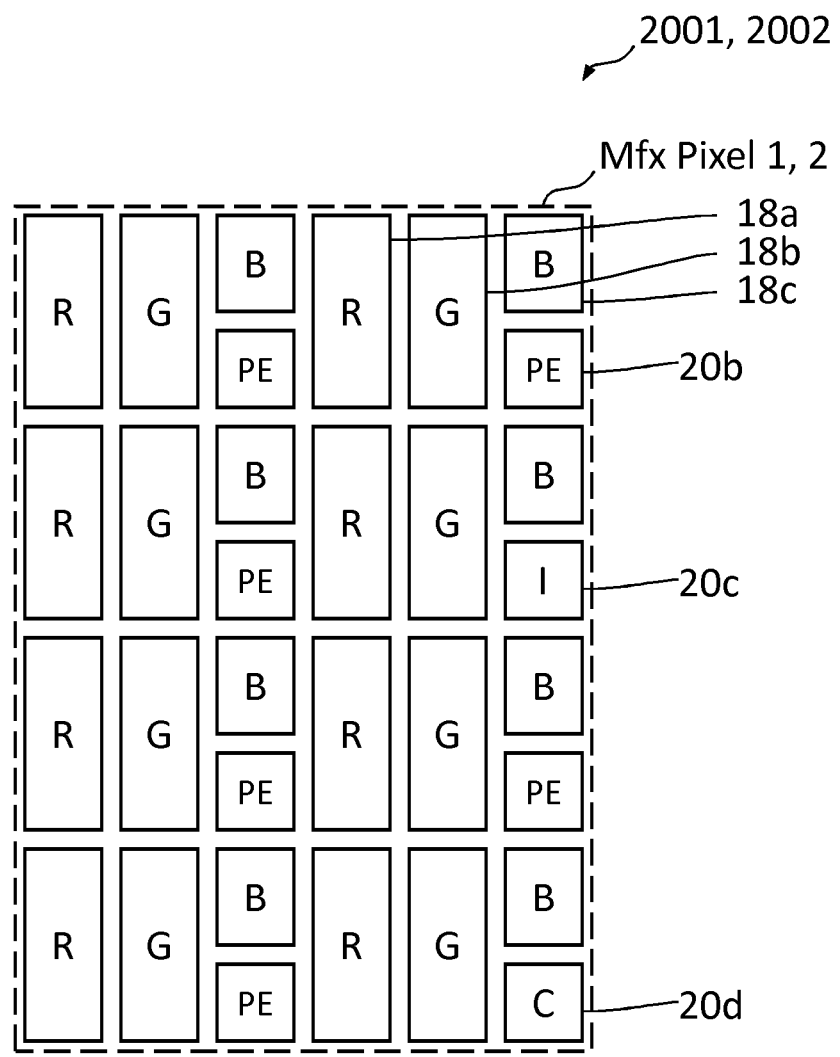
Figure 14T:
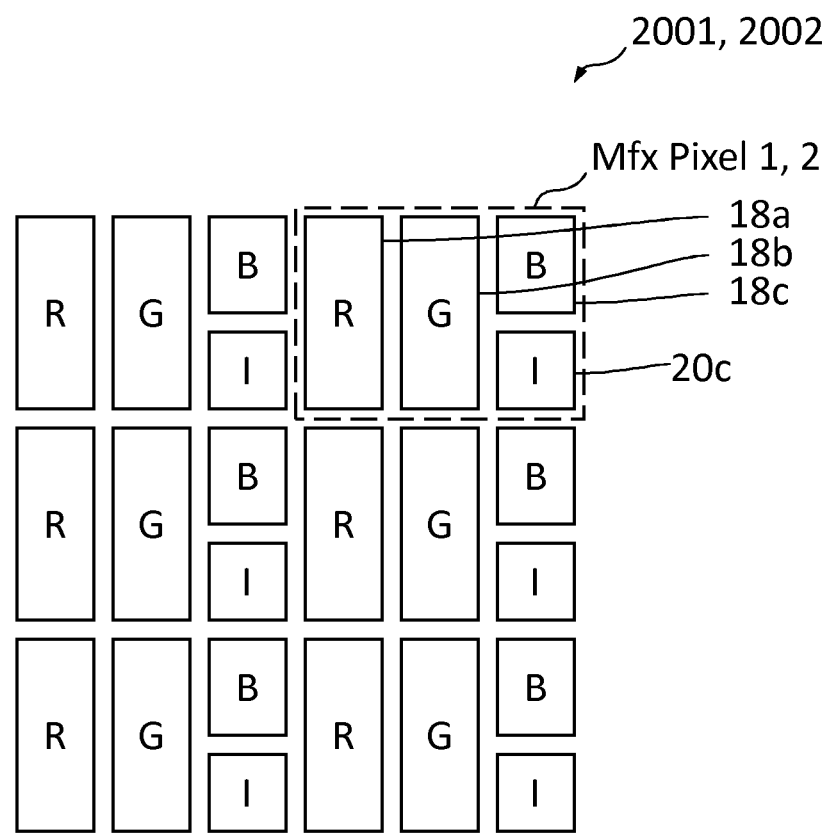
Figure 14U:
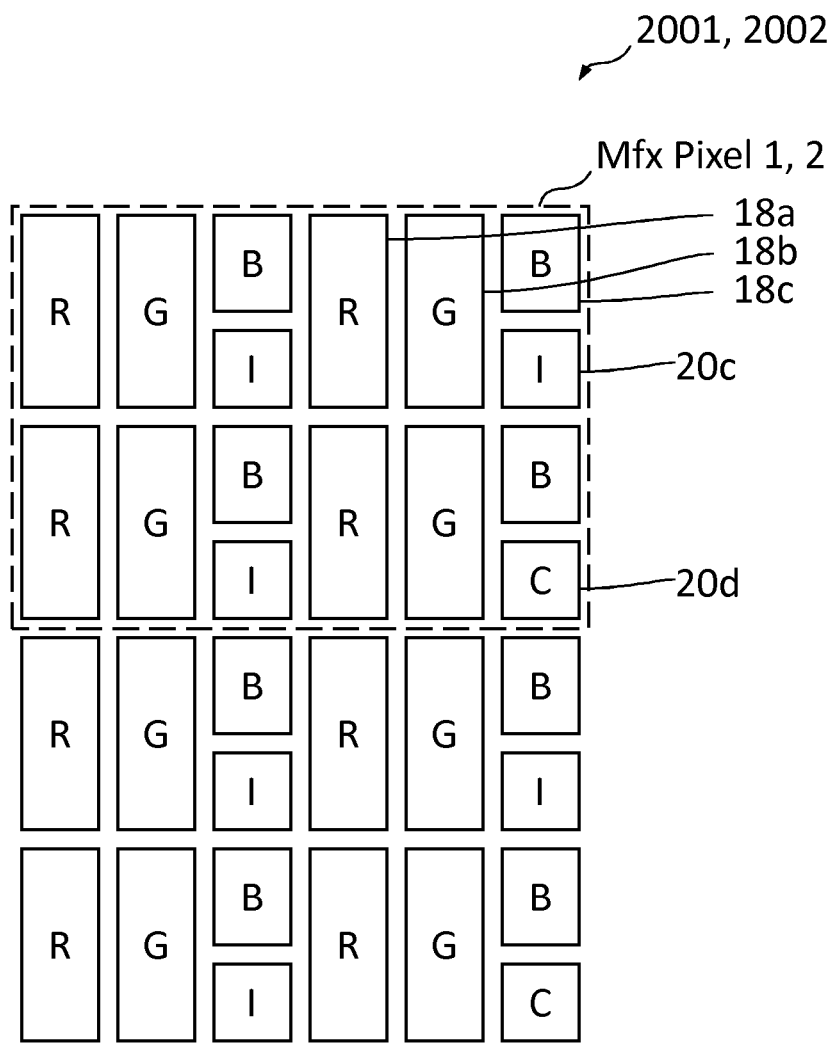
Figure 14V:
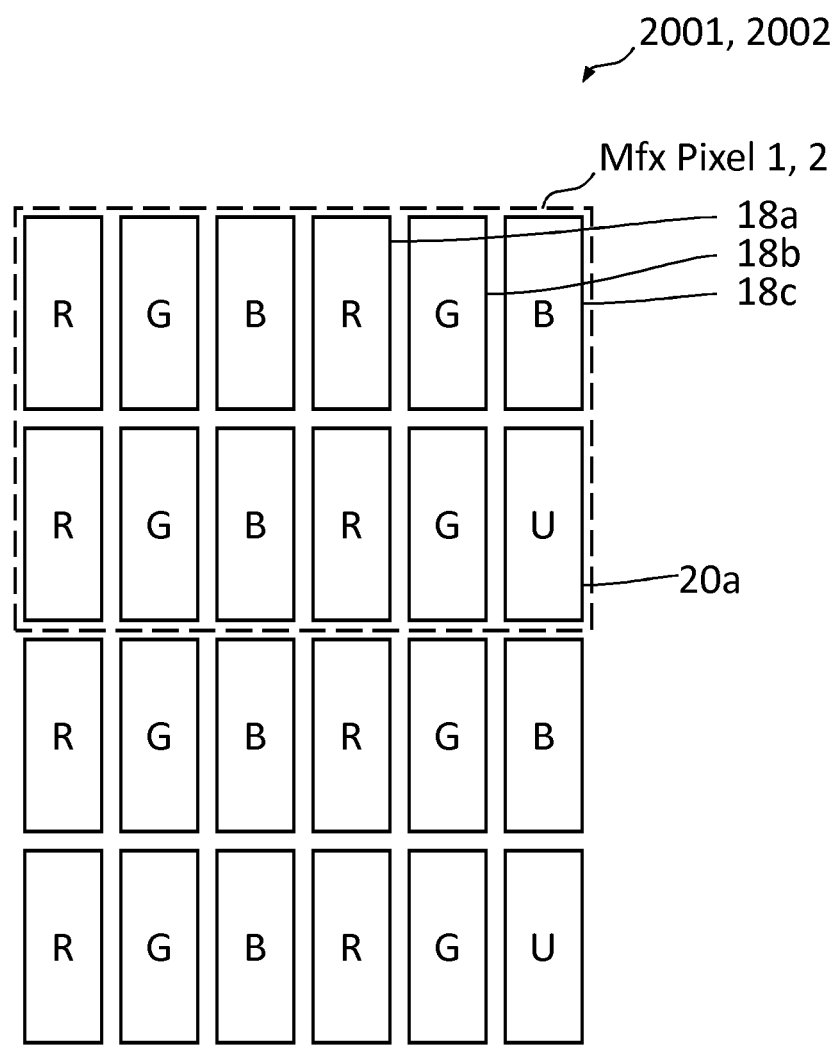
Figure 14W:
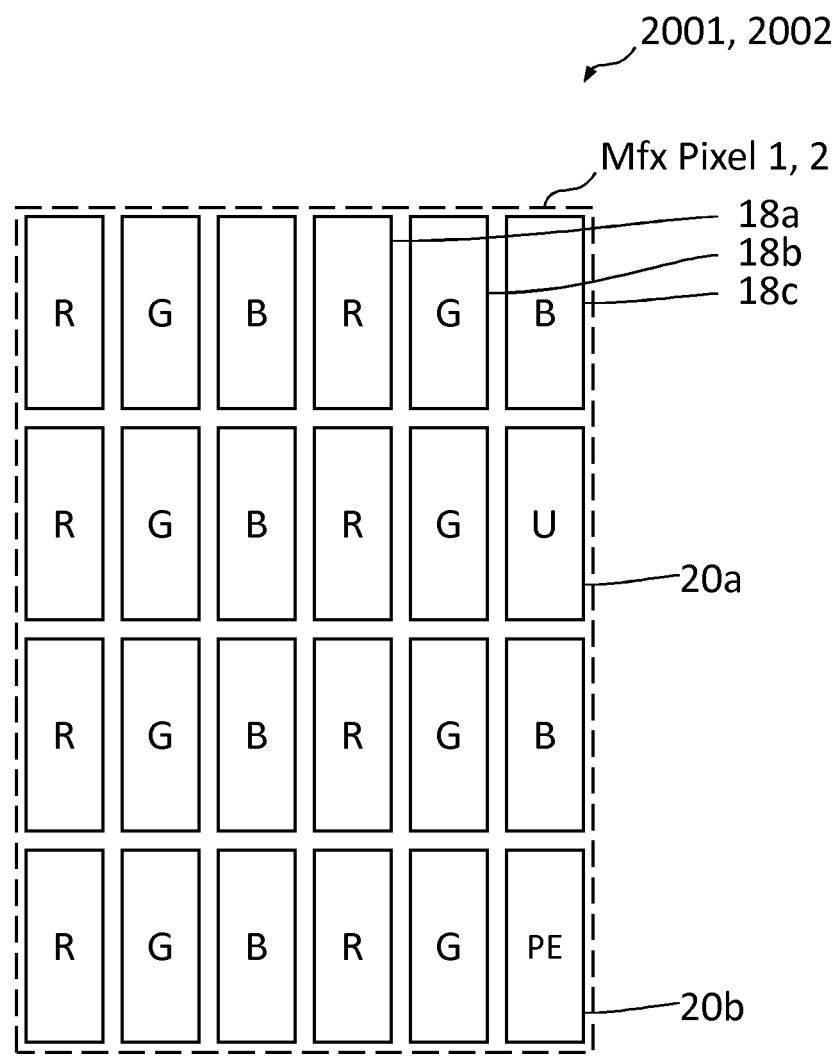
Figure 14X:
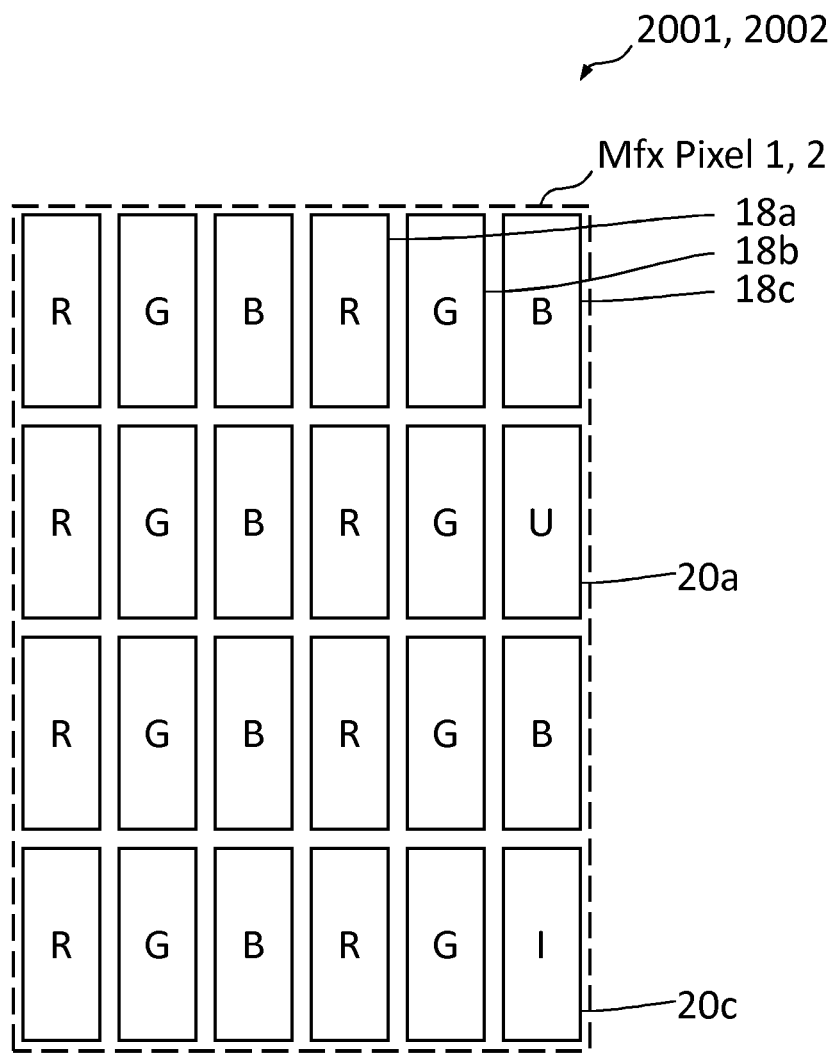
Figure 14Y:
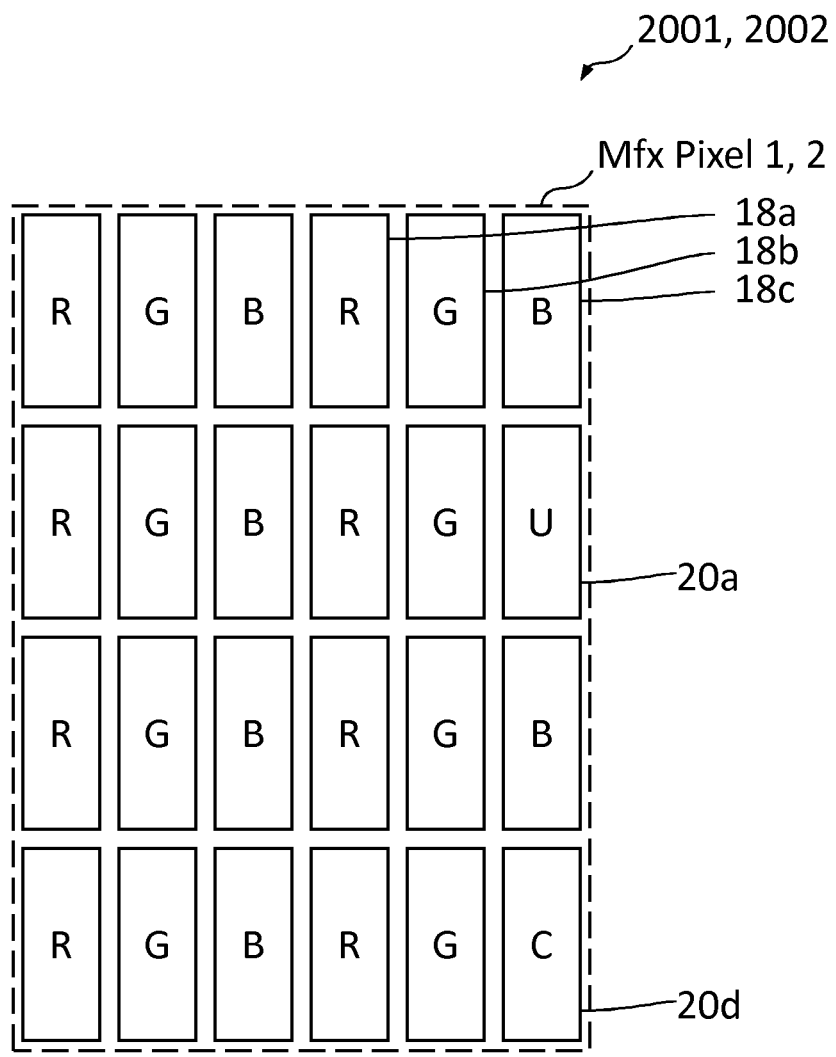
Figure 14Z:
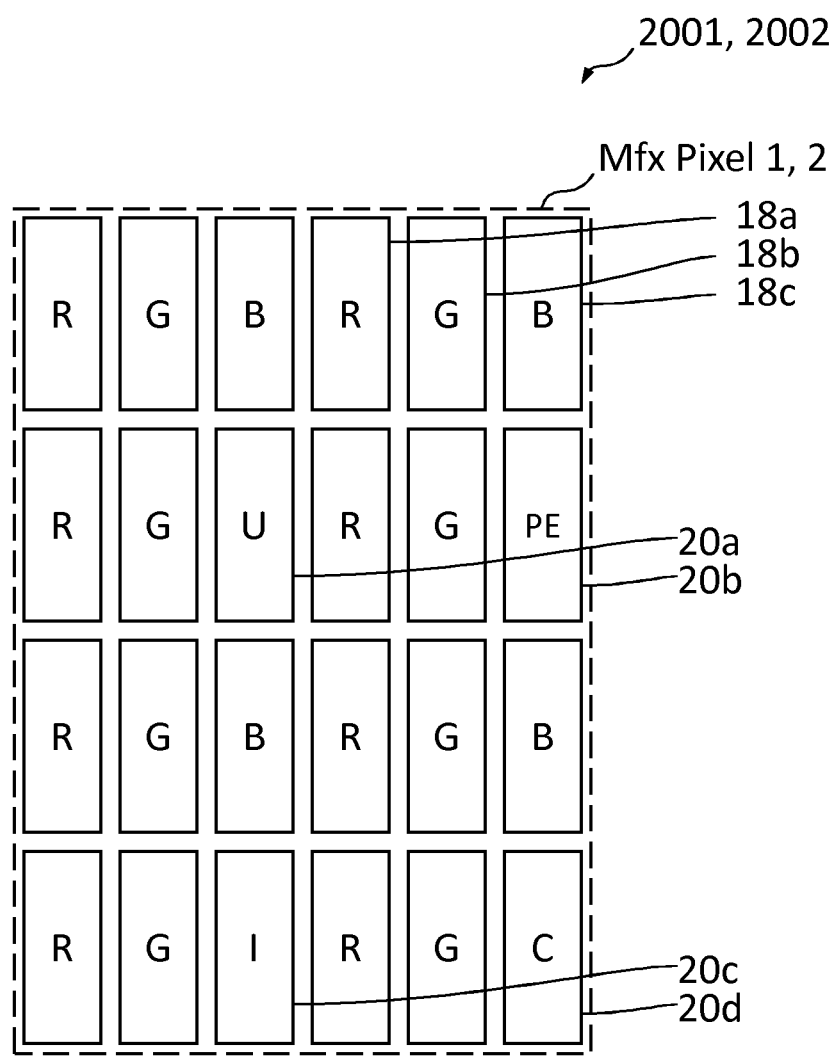
Figure 14A:
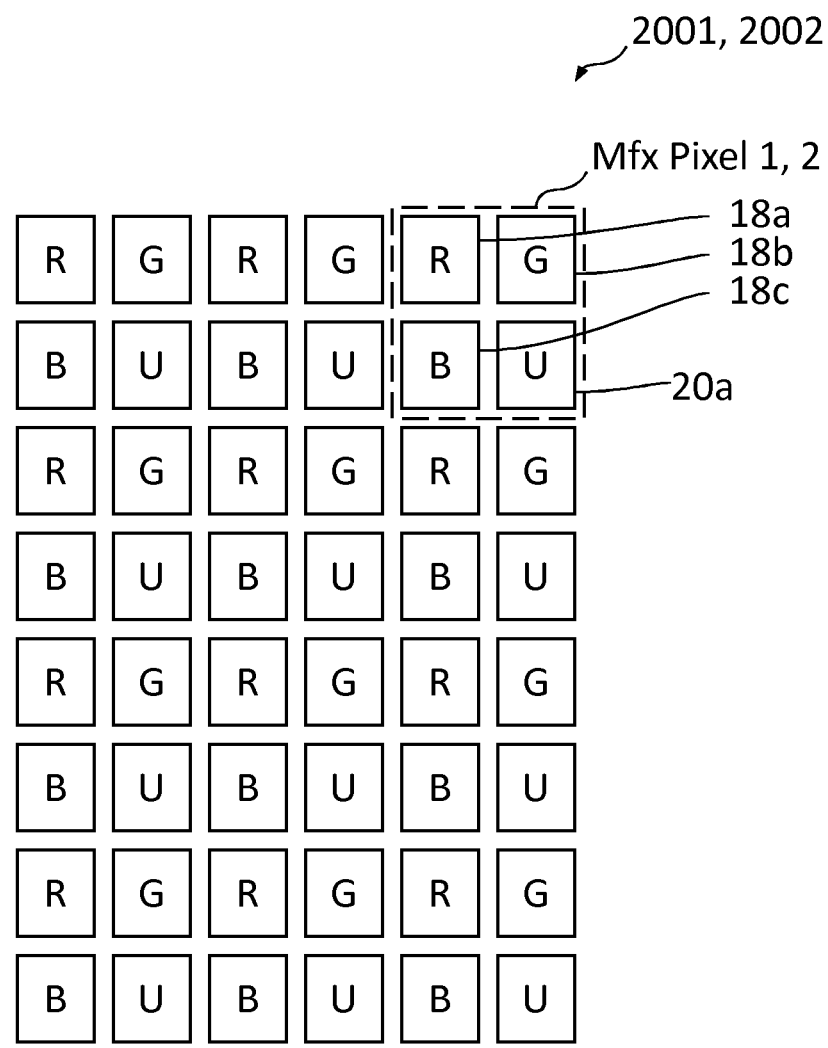
Figure 14A:
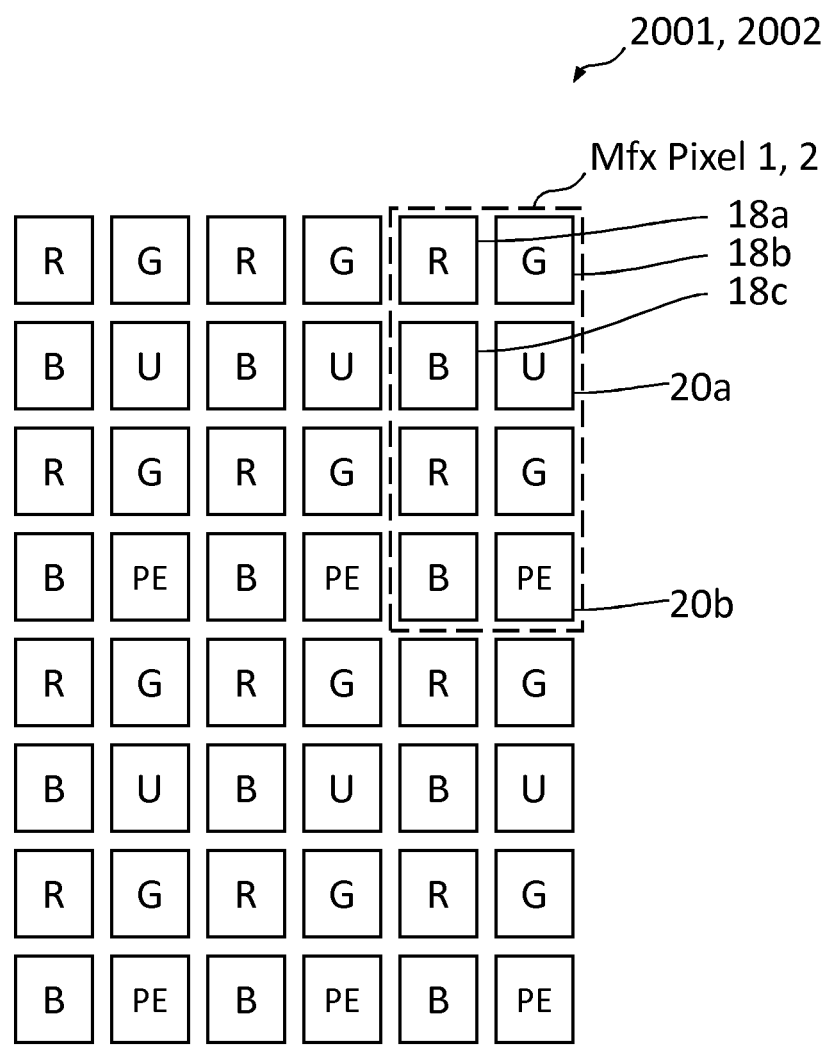
Figure 14A:
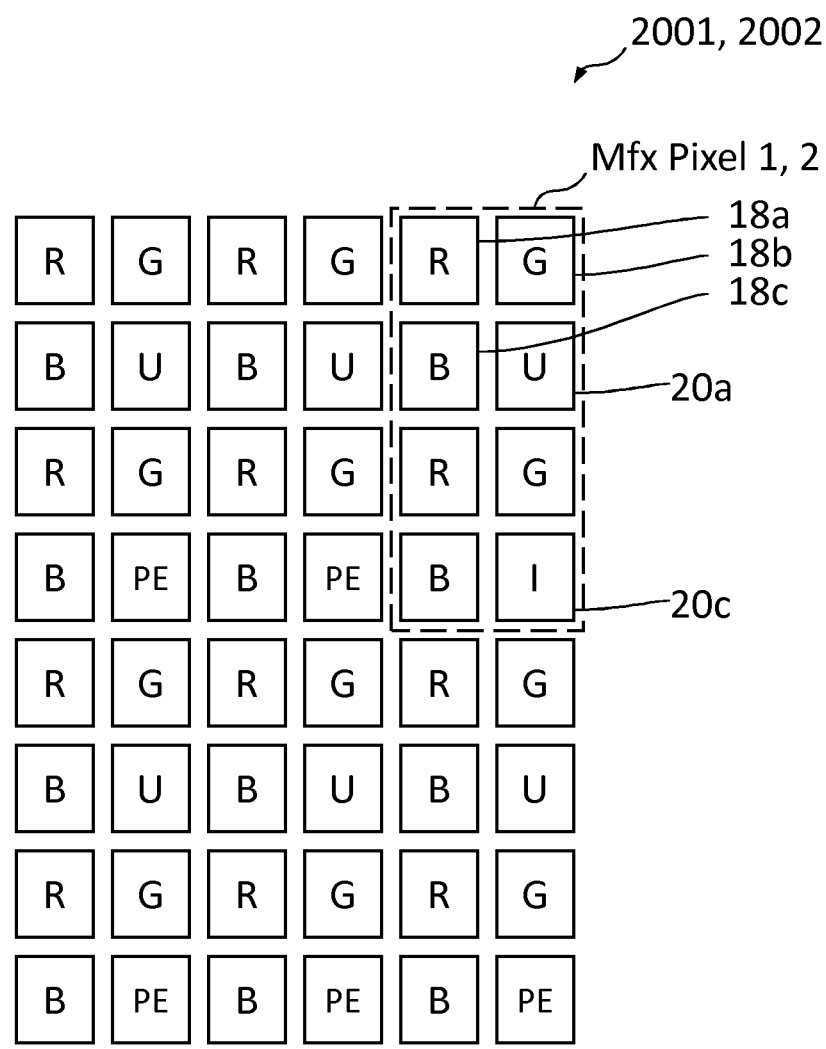
Figure 14A:
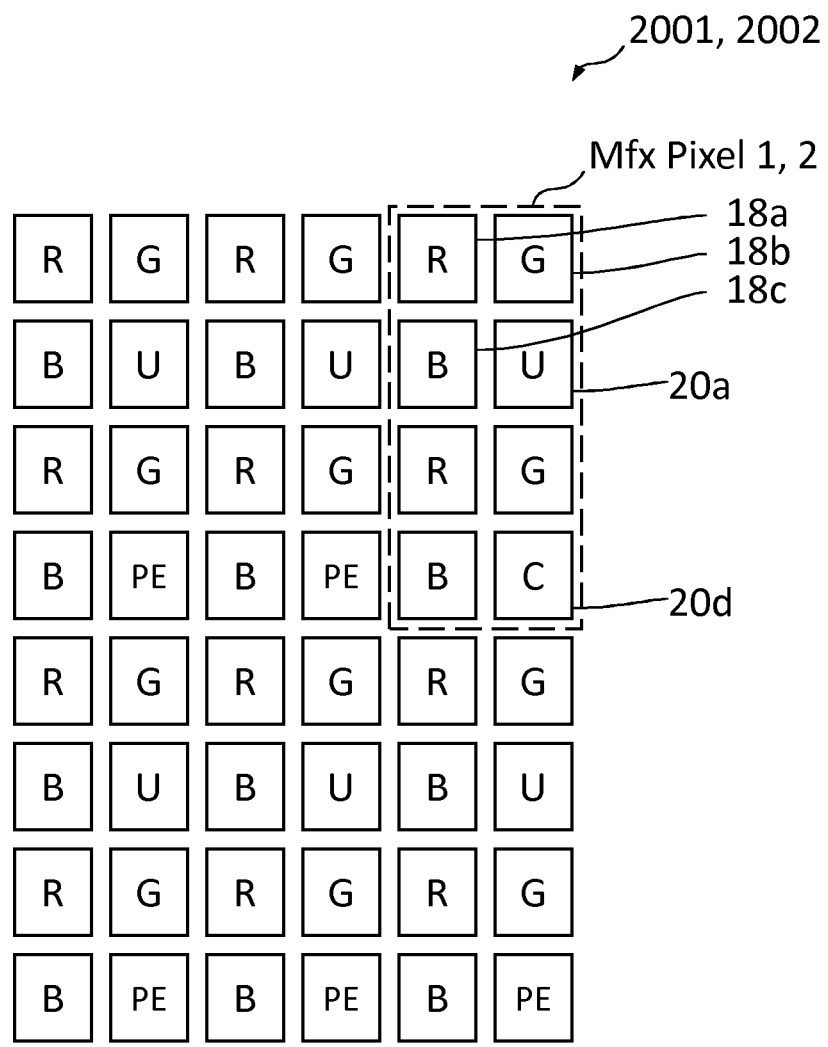
Figure 14A:
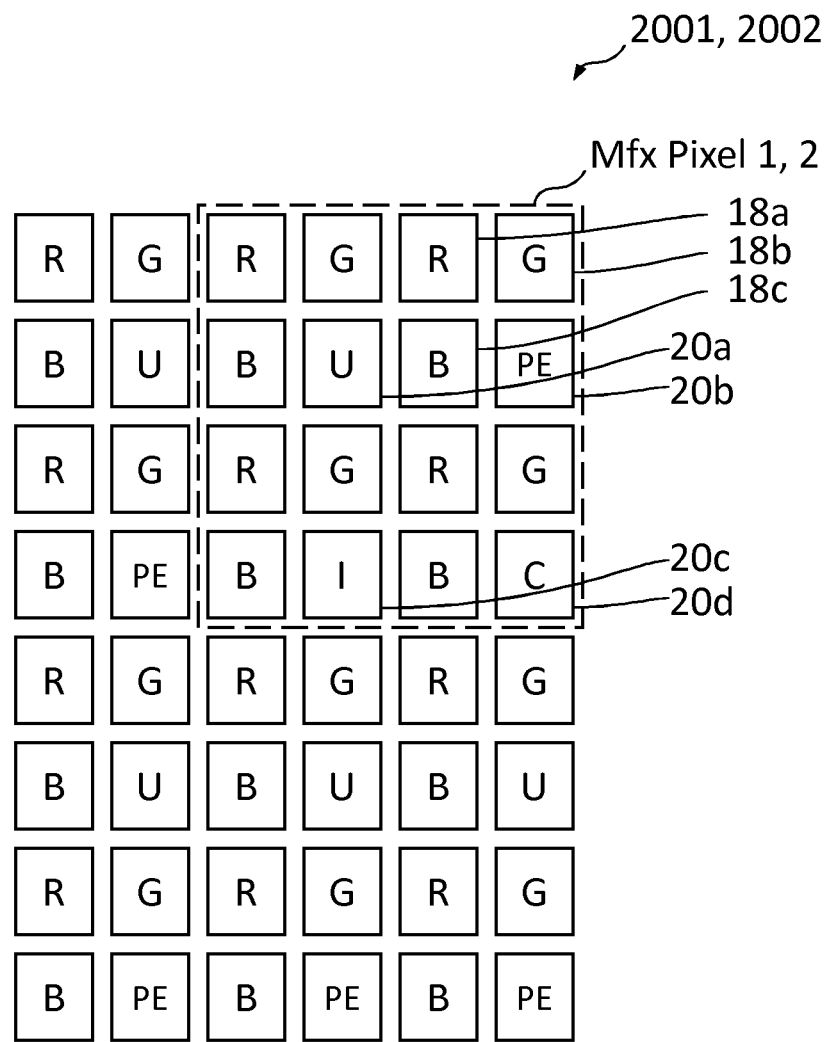

FIGS. 14H-14U depict various arrangements of sensors and sensor types within a multifunctional pixel. In these arrangements, a portion of a blue sub-pixel 18c in a red-green-blue display pixel 18 is diminished to allow the position of various sensors and sensor types within the multifunctional pixel 1, 2 when formed as part of a multifunctional pixel display array 2001, 2002. The blue sub-pixel 18c may be more efficient in LCD, OLED and reflective displays so that the area allocated to the blue sub-pixel may be reduced relative to other display sub-pixels such as a red sub-pixel 18a or a green sub-pixel 18b and not substantially affect display performance. An ultrasonic sensor 20a may be positioned within the multifunctional pixel 1, 2 as shown in FIG. 14H. An ultrasonic sensor 20a and a photoelectric sensor 20b may be positioned within the multifunction pixel 1, 2 as shown in FIG. 14I. An ultrasonic sensor 20a and an infrared sensor 20c may be positioned within the multifunctional pixel 1, 2 as shown in FIG. 14J. An ultrasonic sensor 20a and a capacitive sensor 20d may be positioned within the multifunctional pixel 1, 2 as shown in FIG. 14K. An ultrasonic sensor 20a, a photoelectric sensor 20b, and an infrared sensor 20c may be positioned within the multifunctional pixel 1, 2 as shown in FIG. 14L. An ultrasonic sensor 20a, a photoelectric sensor 20b, and a capacitive sensor 20d may be positioned within the multifunctional pixel 1, 2 as shown in FIG. 14M. An ultrasonic sensor 20a, an infrared sensor 20c, and a capacitive sensor 20d may be positioned within the multifunctional pixel 1, 2 as shown in FIG. 14N. An ultrasonic sensor 20a, a photoelectric sensor 20b, an infrared sensor 20c and a capacitive sensor 20d may be positioned within a multifunctional pixel 1, 2 as shown in FIG. 14O. In further arrangements, a photoelectric sensor 20b may be positioned within the multifunctional pixel 1, 2 as shown in FIG. 14P. A photoelectric sensor 20b and an infrared sensor 20c may be positioned within a multifunctional pixel 1, 2 as shown in FIG. 14Q. A photoelectric sensor 20b and a capacitive sensor 20d may be positioned within a multifunctional pixel 1, 2 as shown in FIG. 14R. A photoelectric sensor 20b, an infrared sensor 20c, and a capacitive sensor 20d may be positioned within a multifunctional pixel 1, 2 as shown in FIG. 14S. In further arrangements, an infrared sensor may be positioned within a multifunctional pixel 1, 2 as shown in FIG. 14T. An infrared sensor 20c and a capacitive sensor 20d may be positioned within a multifunctional pixel 1, 2 as shown in FIG. 14U. Address, data and sense lines are not shown in these FIGS. 14H-14U for clarity. FIGS. 14V-14Z depict various arrangements of sensors and sensor types within a multifunctional pixel, where a blue sub-pixel 18c is replaced with a sensor in various places within a display array. As the blue sub-pixel may be more efficient that other sub-pixels such as a red sub-pixel or a green sub-pixel, replacing the blue sub-pixel every so often with a sensor may result in minimal reduction of the display performance. FIG. 14V includes an ultrasonic sensor 20a along with display sub-pixels 18a-c in a multifunctional pixel 1, 2 that may be part of a multifunctional pixel display array 2001, 2002. FIG. 14W includes an ultrasonic sensor 20a and a photoelectric sensor 20b in a multifunctional pixel 1, 2. FIG. 14X includes an ultrasonic sensor 20a and an infrared sensor 20c in a multifunctional pixel 1, 2. FIG. 14Y includes an ultrasonic pixel 20a and a capacitive sensor 20d in a multifunctional pixel 1, 2. FIG. 14Z includes an ultrasonic pixel 20a, a photoelectric sensor 20b, an infrared sensor 20c, and a capacitive sensor 20d in a multifunctional pixel 1, 2. Address, data and sense lines are not shown in these FIGS. 14V-14Z for clarity. Other configurations (not shown) include an ultrasonic sensor 20a, a photoelectric sensor 20b, and an infrared sensor 20c or a capacitive sensor 20d in a multifunctional pixel 1, 2; an ultrasonic sensor 20a, an infrared sensor 20c, and a capacitive sensor 20d in a multifunctional pixel 1, 2; a photoelectric sensor 20b in a multifunctional pixel 1, 2; a photoelectric sensor 20b and an infrared sensor 20c or a capacitive sensor 20d in a multifunctional pixel 1, 2; a photoelectric sensor 20b, an infrared sensor 20c, and a capacitive sensor 20d in a multifunctional pixel 1, 2; an infrared sensor 20c in a multifunctional pixel 1, 2; and an infrared sensor 20c and a capacitive sensor 20d in a multifunctional pixel 1, 2. FIGS. 14AA-14AE depict additional arrangements of sensors and sensor types within a multifunctional pixel. These arrangements represent various quad configurations, where the red, green and blue sub-pixels along with one or more sensors are arranged in an approximately two-by-two configuration or a multiple thereof. In these arrangements, sensor data may be collected in lieu of driving the blue sub-pixel. Alternatively, a separate drive and/or sense line may be associated with the sensor. FIG. 14AA shows a multifunctional pixel 1, 2 with an ultrasonic sensor 20a and display sub-pixels 18a-c in a quad arrangement. FIG. 14AB shows a multifunctional pixel 1, 2 with an ultrasonic sensor 20a, a photoelectric sensor 20b, and display sub-pixels 18a-c. FIG. 14AC shows a multifunctional pixel 1, 2 with an ultrasonic sensor 20a, an infrared sensor 20c, and display sub-pixels 18a-c. FIG. 14AD shows a multifunctional pixel 1, 2 with an ultrasonic sensor 20a, a capacitive sensor 20d, and display sub-pixels 18a-c. FIG. 14AE shows a multifunctional pixel 1, 2 with an ultrasonic sensor 20a, a photoelectric sensor 20b, an infrared sensor 20c, a capacitive sensor 20d, and display sub-pixels 18a-c. Other arrangements include display pixels with one or more ultrasonic sensors 20a, photoelectric sensors 20b, infrared sensors 20c or capacitive sensors 20d, and combinations thereof.

It is also possible to have an embodiment where one or more sensors are interspersed with the display sub-pixels in each multifunctional pixel, or an embodiment where the display sub-pixels and sensor elements are in quantities and positions other than those shown.

As the resolution of the sensor elements in a multifunctional pixel display array may be configured to be adjustable during operation such as by accessing alternate rows and alternate columns, addressing a subset of rows and columns, or skipping groups of one or more rows or columns, the frame rate of data acquisition from the sensors may also be adjustable. That is, the frame rate for the sensor elements may be higher than, the same as or lower than the frame rate for the display elements. In one example, the frame rate of an in-cell capacitive sensor array may be much faster than the display update rate, so that touch or stylus input data may be acquired at a rapid rate when needed such as for stylus tracking. In another example, the frame rate of an in-cell ultrasonic fingerprint sensor array may be reduced from the display update rate to allow the acquisition of high-resolution biometric information such as fingerprints. The frame rate for the acquisition of sensor data may be dynamic, based on the varying need for sensor data with different applications. The frame size may be dynamic, allowing rapid access of sensor data from smaller portions of the display array to allow, for example, tracking of a stylus or other object on or near the surface of the display array. The dynamic frame size and dynamic frame rate may be used to detect gestures of objects on or near the display array, allowing rapid tracking of the gesture. In some modes, a portion or all of the sensor elements may be accessed in a reverse direction for at least a time. In one mode of operation, the acquisition of sensor data from a multifunctional pixel display array may be suspended for a time when no sensor data is requested, while updates to the display elements in the display array continue. In a different mode of operation, the backlight of an LCD-based display array may be turned off or darkened to allow sensor data such as data from photoelectric sensors in the display array to be taken.

It is also possible, in a different embodiment where independent accessing of display elements and sensor elements is provided for, the use of common row-select lines or common video input and sensor output lines may place constraints on the timing and order of providing video or display input data and acquiring sensor output data. For example, the sequence may be to first write the video data and second read the sensor output data, and then repeat. In a second example, the video or display data may be written for multiple consecutive frames, with one or more sensor acquisition frames inserted between the write frames when needed. In a third example, the video or display data may be written nearly continuously, with sensor data taken when there is a lull in the display data or a need for acquiring sensor data arises. In a fourth example, the sensors in the display array may be accessed at a very low frame rate (e.g. once every second, minute, hour or more) while the display is off until the display is turned on or some other event occurs.

FIG. 15A depicts an ultrasonic (piezoelectric) sensor 20a that can be used in conjunction with a multifunctional pixel 1, 2 in the multifunctional pixel system as shown in FIGS. 14A and 14B. The piezoelectric sensor may be used, for example, to measure higher frequency ultrasonic signals, medium-frequency acoustic signals, or low-frequency applied pressure or force signals. The piezoelectric sensor may detect, for example, acoustic emissions that may be emitted when a finger or stylus rubs or taps the surface of a display array. FIG. 15B depicts an infrared (pyroelectric) sensor 20c that can be used in the multifunctional pixel system shown in FIGS. 14A and 14B. The pyroelectric sensor may be used, for example, to detect infrared energy, thermal energy, or heat. FIG. 15C depicts a photoelectric sensor 20b that can be used in the multifunctional pixel system shown in FIGS. 14A and 14B. The photoelectric sensor may be used, for example, to detect optical light or infrared light. FIG. 15D depicts a capacitive sensor 20d that may be used in the multifunctional pixel 1, 2. The capacitive sensor 20d may be used, for example, to detect capacitance or changes in capacitance from an object such as a finger placed on or near the multifunctional pixel 1, 2.

In conjunction with the described embodiments, an apparatus is disclosed that includes a system for receiving a user selection of a media item to be transferred. For example, the system for receiving the user selection of the media item may be an in-cell system including a multifunctional pixel 1, 2, such as those depicted in FIG. 1 and FIGS. 2A-2C. A media item can include digital media where data is stored in digital form, such as digital video, audio, art, or the like.

Those of skill would further appreciate that the various illustrative logic blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A multifunctional pixel comprising:
    a display pixel;
    a photoelectric sensor; and
    a second sensor selected from the following: an ultrasonic sensor and an infrared sensor;
    wherein the display pixel, the photoelectric sensor, and the second sensor are coplanar relative to one another and located in the multifunctional pixel;
    wherein the second sensor includes a piezoelectric layer having pyroelectric properties.

2. The multifunctional pixel of claim 1, wherein the display pixel, the photoelectric sensor, and the second sensor are located on a common substrate.

3. The multifunctional pixel of claim 2, wherein the photoelectric sensor and the second sensor are positioned in contact with one another on the substrate.

4. The multifunctional pixel of claim 3, wherein the display pixel is positioned in contact with the photoelectric sensor and the second sensor on the substrate.

5. The multifunctional pixel of claim 1, wherein the second sensor includes a piezoelectric layer.

6. The multifunctional pixel of claim 1, further comprising an infrared sensor located in the multifunctional pixel; wherein the second sensor is the ultrasonic sensor.

7. The multifunctional pixel of claim 6, wherein the display pixel, the photoelectric sensor, the ultrasonic sensor, and the infrared sensor are located on a common substrate.

8. The multifunctional pixel of claim 6, wherein the display pixel, the photoelectric sensor, the ultrasonic sensor, and the infrared sensor lie substantially along a single plane.

9. The multifunctional pixel of claim 1, wherein the multifunctional pixel is a component in a visual display, the visual display being included in one of the following: a mobile device, a medical device, and a consumer device.

10. The multifunctional pixel of claim 1, wherein the photoelectric sensor or the second sensor is configured to detect an object that touches or is near to the multifunctional pixel.

11. The multifunctional pixel of claim 1, wherein the multifunctional pixel is combined with additional multifunctional pixels to form a multifunctional pixel display array.

12. The multifunctional pixel of claim 11, wherein the second sensors in the multifunctional pixel display array have a resolution, the resolution being configured to be adjustable.

13. The multifunctional pixel of claim 11, wherein the photoelectric sensors in the multifunctional pixel display array have a resolution, the resolution being configured to be adjustable.

14. The multifunctional pixel of claim 11, further comprising display input lines and sensor output lines;

wherein a respective display input line of the display input lines is in electrical communication with the display pixel of a respective multifunctional pixel of the multifunctional pixels; and wherein a respective sensor output line of the output lines is in electrical communication with the photoelectric sensor and the second sensor of the respective multifunctional pixel.

15. The multifunctional pixel of claim 14, wherein the photoelectric sensors and the second sensors are configured to have different frame rates than the display pixels.

16. The multifunctional pixel of claim 11, further comprising a plurality of row select lines, each row select line in electrical communication with the display pixel, the photoelectric sensor, and the second sensor in a respective multifunctional pixel of the multifunctional pixels.

17. The multifunctional pixel of claim 11, further comprising a plurality of display input lines and a plurality of sensor output lines;

wherein each of the display input lines are in electrical communication with a plurality of the display pixels; and wherein each of the sensor output lines are in electrical communication with a plurality of the photoelectric sensors and a plurality of the second sensors.

18. The multifunctional pixel of claim 11, further comprising a plurality of row select lines;

wherein each of the row select lines are in electrical communication with a plurality of the display pixels, a plurality of the photoelectric sensors, and a plurality of the second sensors of the multifunctional pixels.

19. The multifunctional pixel of claim 1, wherein one or more multifunctional pixels are combined with one or more display pixels to form a display array, wherein the one or more display pixels do not include one or more sensors.

20. The multifunctional pixel of claim 1, further comprising an ultrasonic transmitter attached to a first side of a substrate, wherein the multifunctional pixel is located on a second side of the substrate, the second side of the substrate being opposite to the first side of the substrate.

21. The multifunctional pixel of claim 1, wherein the display pixel includes a red sub-pixel, a green sub-pixel, and a blue sub-pixel.

22. The multifunctional pixel of claim 1, further comprising a platen, wherein the second sensor is configured to detect energy reflected from the platen.

23. The multifunctional pixel of claim 1, further comprising a lens configured to focus ultrasonic energy, optical energy, or infrared energy onto the multifunctional pixel.

24. The multifunctional pixel of claim 23, wherein the lens is an optical lens formed by a curved platen, the curved platen forming an outer surface of the multifunctional pixel.

25. The multifunctional pixel of claim 23, wherein the lens is integrated into a multifunctional button.

26. The multifunctional pixel of claim 25, wherein the button is on one of the following: a tablet computer and an automatic teller machine.

27. The multifunctional pixel of claim 25, further comprising a capacitive sensor located in the multifunctional pixel.

28. The multifunctional pixel of claim 1, further comprising a black mask associated with the display pixel.

29. The multifunctional pixel of claim 1, further comprising:

a reflective layer positioned below the second sensor;

a backlight panel positioned below the display pixel, the photoelectric sensor, and the second sensor;

wherein the reflective layer is configured to redirect light emitted from the backlight panel toward the backlight panel.

* * * * *